(12) United States Patent
Ichioka et al.

(10) Patent No.: US 7,944,521 B2
(45) Date of Patent: May 17, 2011

(54) DISPLAY APPARATUS AND ELECTRONIC APPARATUS WITH THE SAME

(75) Inventors: Hideki Ichioka, Nabari (JP); Tomohiko Yamamoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 307 days.

(21) Appl. No.: 12/376,753

(22) PCT Filed: Jun. 14, 2007

(86) PCT No.: PCT/JP2007/061991
§ 371 (c)(1),
(2), (4) Date: Feb. 6, 2009

(87) PCT Pub. No.: WO2008/018234
PCT Pub. Date: Feb. 14, 2008

(65) Prior Publication Data
US 2010/0177259 A1    Jul. 15, 2010

(30) Foreign Application Priority Data
Aug. 11, 2006    (JP) ................. 2006-220566

(51) Int. Cl.
*G02F 1/1333*    (2006.01)
*H02B 1/015*    (2006.01)
(52) U.S. Cl. ............... 349/58; 349/122; 361/644
(58) Field of Classification Search ............ 349/58, 349/122; 361/644
See application file for complete search history.

(56) References Cited

U.S. PATENT DOCUMENTS

| 6,847,415 B1 * | 1/2005 | Yoshimura et al. ............ 349/58 |
| 2005/0151041 A1 * | 7/2005 | Tatsukami et al. ....... 248/220.21 |
| 2006/0044490 A1 | 3/2006 | Ichioka et al. |

FOREIGN PATENT DOCUMENTS

| JP | 03-047584 U | 5/1991 |
| JP | 08-179289 A | 7/1996 |
| JP | 11-085045 A | 3/1999 |
| JP | 11-174206 A | 7/1999 |

(Continued)

OTHER PUBLICATIONS

Ichioka et al.: Liquid Crystal Display Device and Electronic Apparatus Provided with Same; U.S. Appl. No. 12/375,860, filed Jan. 30, 2009.

(Continued)

*Primary Examiner* — Mike Qi
(74) *Attorney, Agent, or Firm* — Keating & Bennett, LLP

(57) ABSTRACT

A display apparatus includes a liquid crystal display panel, a front side viscoelastic layer, a front side hard layer, a back side viscoelastic layer, a back side hard layer, a backlight unit, a driving circuit board, and a metal plate. The front side viscoelastic layer that is viscoelastic covers a display surface of the liquid crystal display panel. The front side hard layer has a higher modulus of elasticity than the front side viscoelastic layer. The back side viscoelastic layer that is viscoelastic covers a back surface of the liquid crystal display panel. The back side hard layer has a higher modulus of elasticity than the back side viscoelastic layer. The back side viscoelastic layer has a thickness Tb of not less than about 20 μm, and the front side viscoelastic layer has a thickness Ta and satisfies: Ta/Tb>1 (Tb≠0). Thus, the display apparatus is resistant to breakage caused by a load placed on a display surface of the liquid crystal display panel and an impact when dropped, thereby attaining mechanical durability.

32 Claims, 22 Drawing Sheets

FOREIGN PATENT DOCUMENTS

| | | |
|---|---|---|
| JP | 11-258599 A | 9/1999 |
| JP | 2000-315054 A | 11/2000 |
| JP | 2001-142404 A | 5/2001 |
| JP | 2001-188222 A | 7/2001 |
| JP | 2001-266759 A | 9/2001 |
| JP | 2003-149642 A | 5/2003 |
| JP | 2003-272422 A | 9/2003 |
| JP | 2004-163462 A | 6/2004 |
| JP | 2006-065008 A | 3/2006 |
| JP | 2006065008 A * | 3/2006 |
| WO | 2008/018232 A1 | 2/2008 |

OTHER PUBLICATIONS

Official Communication issued in International Patent Application No. PCT/JP2007/061991, mailed on Jul. 10, 2007.

* cited by examiner

Ta/Tb≒1

Ta/Tb＞1

$Ta1/Tb1 \fallingdotseq Ta2/Tb2 \fallingdotseq 1$ $(Ta1+Ta2)/(Tb1+Tb2) > 1$

FIG. 20

| SHAPE | DIFFERENCE IN SECOND MOMENT OF AREA [$I$] PLATE | $I$: SECOND MOMENT OF AREA PRESENT ARRANGEMENT |
|---|---|---|
| | (rectangular plate with width $b_1$ and thickness $t_1$) | (I-beam cross-section with flanges of width $b_2$, thickness $t_2/2$ each, and web of height $b_1$, thickness $t_1$) |
| $I$ | $\dfrac{b_1 * t_1^3}{12}$ | $\dfrac{b_1 * t_1^3 \;+\; 2 * b_2 * t_2^3}{12}$ |

- 301: LIQUID CRYSTAL DISPLAY PANEL
- 302b: LIGHT GUIDING PLATE
- 303: METAL PLATE
- 304: DRIVING CIRCUIT BOARD

BREAKAGE

- 301: LIQUID CRYSTAL DISPLAY PANEL
- 302b: LIGHT GUIDING PLATE
- 303: METAL PLATE
- 304a
- 304: DRIVING CIRCUIT BOARD

DISPLAY APPARATUS AND ELECTRONIC APPARATUS WITH THE SAME

BACKGROUND OF THE INVENTION

1. Field of the Invention

The present invention relates to a display apparatus such as a liquid crystal display device, suitable as a display section of a portable electronic apparatus or a stationary electronic apparatus, and an electronic apparatus including the display apparatus. More specifically, the present invention is related to strength reinforcement of, for example, a slim flat panel display device. Further, the present invention relates to reinforcement in strength of a stationary electronic apparatus including a large-sized liquid crystal display device such as a liquid crystal TV (television) or the like as one example, when carrying or handling the stationary electronic apparatus.

2. Description of the Related Art

In recent years, a flat panel display device such as a liquid crystal display device and an electroluminescence display device (hereinafter referred to as "EL display device") has been frequently used as a display (display section) of a portable electronic apparatus (hereinafter referred to as "mobile apparatus") and the like. The flat panel display device installed in such a mobile apparatus requires, in addition to mobility, a particularly high mechanical durability.

The liquid crystal display device has also been commercialized as a stationary large-sized apparatus such as a slim TV, and such a liquid crystal display device is becoming widely spread. In recent years, demands for reducing thickness and weight of such stationary product have also been increasing. Therefore, similar to the mobile apparatus, the large-sized liquid crystal display device is required to be, not only thin and lightweight, but also sufficiently durable and resistant to external pressure applied when carried, handled or generally used.

However, with the mobile apparatus which excels in mobility, and the thin and lightweight portable or stationary flat panel display device, transparent substrates that are provided on a front surface of its display panel is thin. Thus, the display panel itself is extremely fragile.

Therefore, a conventional flat panel display device is generally arranged such that a protection board having a relatively high mechanical durability is provided on the display panel, so that the fragile display panel is protected, as described in, for example, Japanese Unexamined Patent Publication No. 266759/2001 (Tokukai 2001-266759) and Japanese Unexamined Patent Publication No. 174206/1999 (Tokukaihei 11-174206).

More specifically, as illustrated in FIG. 21, an impact relaxing layer 103 and a glass dispersion prevention layer 104, each of which have different modulus of elasticity, are stacked in this order on a glass panel substrate 101 of the display panel, via an adhesive layer 102.

However, in the conventional display device, the impact relaxing layer 103 and the glass dispersion prevention layer 104, which are protection layers having a relatively thick thickness, are only provided on a front side of the display panel, in order to attain a desired mechanical durability. Hence, the conventional display apparatus is arranged so that impact from only the front side is relaxed.

However, generally, in a liquid crystal display device and the like, a driving circuit board and the like are provided on a back side of a display panel. Further, as illustrated in FIG. 22, for a transmissive type liquid crystal display device and a transflective type liquid crystal display device and the like, a light guiding plate 202b of a backlight unit 202 is provided on a back side of the liquid crystal display panel 201, and circuit components such as a driving circuit board 204 and the like are provided on a back side of the backlight unit 202. Moreover, for example, a step 207a is formed due to a chassis 207.

Therefore, for example, there is a problem such that when the liquid crystal display device is dropped from a back side of the liquid crystal display device, the liquid crystal display panel 201 may deform or break under impact on the liquid crystal display panel 201 placed on from the driving circuit board 204 side.

Recently, in line with reduction of thickness and weight of the display, thickness of the liquid crystal panel 201 made of glass also tend to be reduced in thickness. Therefore, there is a possibility that the panel may deform or break if only the arrangements of Japanese Unexamined Patent Publication No. 266759/2001 (Tokukai 2001-266759) and Japanese Unexamined Patent Publication No. 174206/1999 (Tokukaihei 11-174206) are provided.

SUMMARY OF THE INVENTION

In view of the conventional problems, preferred embodiments of the present invention provide a display apparatus and a portable electronic apparatus including the display apparatus, which display apparatus has high mechanical durability due to its reduction in breakage of the display apparatus caused by a load placed on a display surface of the display panel and an impact at a time when the display apparatus is dropped.

A display apparatus according to a preferred embodiment of the present invention includes: a display panel; a driving circuit board for driving the display panel; a front side viscoelastic layer that is viscoelastic and covers a display surface of the display panel; a front side hard layer that has a higher modulus of elasticity than the front side viscoelastic layer, and covers the front side viscoelastic layer; a back side viscoelastic layer that is viscoelastic, and covers a back surface of the display panel; a back side hard layer that has a higher modulus of elasticity than the back side viscoelastic layer, and covers the back side viscoelastic layer; and a rigid plate made of rigid material having a plane surface, which is provided on a back side of the back side hard layer, the back side viscoelastic layer having a thickness Tb of not less than about 20 μm, and the front side viscoelastic layer having a thickness Ta and satisfying: Ta/Tb>1 (Tb≠0). Note that "viscoelastic" denotes a property which is viscous and elastic.

Moreover, the display apparatus according to a preferred embodiment of the present invention includes: a display panel; a backlight; a driving circuit board for driving the display panel and the backlight; a front side viscoelastic layer that is viscoelastic, and covers a display surface of the display panel; a front side hard layer that has a higher modulus of elasticity than the front side viscoelastic layer, and covers the front side viscoelastic layer; a back side viscoelastic layer that is viscoelastic, and covers a back surface of the display panel; a back side hard layer that has higher modulus of elasticity than the back side viscoelastic layer, and covers the back side viscoelastic layer; and a rigid plate made of rigid material having a plane surface, which is provided on a back side of the back side hard layer, the back side viscoelastic layer having a thickness Tb of not less than about 20 μm, and the front side viscoelastic layer having a thickness Ta and satisfying: Ta/Tb>1 (Tb≠0). Note that "viscoelastic" denotes the property which is viscous and elastic.

According to various preferred embodiments of the invention, both sides of the display panel are protected by the front side viscoelastic layer that is viscoelastic, which covers a display surface of the display panel; the front side hard layer that has a higher modulus of elasticity than the front side viscoelastic layer, which covers the front side viscoelastic layer; the back side viscoelastic layer that is viscoelastic, which covers a back surface of the display panel; and the back surface hard layer that has higher modulus of elasticity than the back side viscoelastic layer, which covers the back side viscoelastic layer.

In a preferred embodiment of the present invention, the front side viscoelastic layer is sandwiched between the liquid crystal display panel and the front side hard layer, and the back side viscoelastic layer is sandwiched between the liquid crystal display panel and the back side hard layer, which front and back side viscoelastic layers are not just a simple adhesive layer. Consequently, the front side viscoelastic layer and the back side viscoelastic layer suppress momentary warp. Hence, externally applied stress, particularly stress that is momentarily applied (i.e., impact), is relaxed and suppressed. As a result, external stress and impact that are propagated to a relatively fragile display panel are effectively suppressed; thus, excellent mechanical durability is attained.

The front side hard layer having the high modulus of elasticity is provided on the front side viscoelastic layer, and the back side hard layer having the high modulus of elasticity is provided on the back side viscoelastic layer. Hence, when external stress is applied, a restoring force, that is, a repulsive force is generated on the front side and back side hard layers. Hence, the external stress is relaxed and dispersed towards a front or back surface of the display panel. As a result, it is possible to effectively suppress the stress that is propagated to the relatively fragile display panel. This allows attainment of an even more excellent mechanical durability of the display apparatus.

A preferred embodiment of the present invention provides a plate (hereinafter referred to as rigid plate) made of rigid material, which is provided between the backlight and the driving circuit board, which plate has a plane surface of a broader area than that of the backlight. Consequently, a whole of the backlight is supported by a surface of the rigid plate. Therefore, even if a load is placed on an upper side of the display panel, the backlight does not bend at an edge of the rigid plate. Even if the backlight is not provided, the rigid plate allows improvement in rigidity of the liquid crystal display panel.

Breakage of the display panel is prevented by an interaction of the front side viscoelastic layer, the front side hard layer, the back side viscoelastic layer, the back side hard layer, and the rigid plate.

Further, it has been demonstrated that durability of the display panel is improved, by carrying out an impact experiment in which a rigid ball having a diameter of approximately 4 cm and a weight of approximately 200 g is dropped from a height of about 30 cm, where the back side viscoelastic layer has a thickness Tb of not less than about 20 μm, and the front side viscoelastic layer of a thickness Ta at that time satisfies: Ta/Tb>1 (Tb≠0).

This provides a display apparatus which has high mechanical durability, since breakage caused by a load placed on the display surface of the display panel and an impact when dropped is reduced.

In a display apparatus according to a preferred embodiment of the present invention, the thickness Ta of the front side viscoelastic layer and the thickness Tb of the back side viscoelastic layer preferably satisfies: Ta/Tb>2 (Tb≠0).

This ensures providing of a display apparatus that has the high mechanical durability, since breakage caused by a load placed on the display surface of the display panel and an impact at a time when the display apparatus is dropped is reduced.

In a display apparatus according to a preferred embodiment of the present invention, the thickness Ta of the front side viscoelastic layer preferably satisfies: Ta≧50 μm.

This softens an impact on the front side of the display panel, which as a result prevents breakage of the front side of the display panel.

Moreover, in a display apparatus according to a preferred embodiment of the present invention, the thickness Tb of the back side viscoelastic layer preferably satisfies: 20 μm≦Tb≦50 μm.

This allows formation of the back side viscoelastic layer having a same thickness as a common adhesive layer.

In a display apparatus according to a preferred embodiment of the present invention, it is preferable for the front side hard layer and back side hard layer to be made of inviscid material.

This allows for the use of common inviscid material as the front side hard layer and the back side hard layer, since the front side hard layer and the back side hard layer are not required to be viscous or viscoelastic.

In a display apparatus according to a preferred embodiment, it is preferable for at least one of the front side hard layer and the back side hard layer to be a polarizing plate.

This allows use of a polarizing plate used in the liquid crystal display panel to be used as the at least one of the front side hard layer and the back side hard layer.

Moreover, it is preferable for at least one of the front side hard layer and the back side hard layer in the display apparatus according to a preferred embodiment of the present invention to be a phase plate.

This allows use of a phase plate used for optical compensation in the liquid crystal display panel to be used as at least one of the front side hard layer and the back side hard layer.

Moreover, in a display apparatus according to a preferred embodiment of the present invention, it is preferable for the front side viscoelastic layer and the back side viscoelastic layer to have nonlinear elasticity, and the front side hard layer and the back side hard layer to have linear elasticity. Note that "linear elasticity" denotes that a load to be applied and a deformation amount are in linear correlation (proportional relation) in a range of elasticity deformation; and on the other hand, "nonlinear elasticity" denotes that the load to be applied and the deformation are not in the linear correlation (proportional relation) in the range of the elasticity deformation.

Thus, due to the nonlinear elasticity, the momentary warp is suppressed in the front side viscoelastic layer and the back side viscoelastic layer. Hence, externally applied stress, particularly stress that is momentarily applied (i.e., impact), is relaxed and suppressed. As a result, the external stress and impact that are propagated to the relatively fragile display panel are effectively suppressed; thus, excellent mechanical durability is attained.

The front side hard layer and the back side hard layer have linear elasticity; when external stress is applied, the restoring force, that is, the repulsive force is positively generated in the front side hard layer and the back side hard layer. Therefore, externally applied stress is relaxed and dispersed along the front or back side of the display panel. As a result, it is possible to positively and effectively suppress the stress that is propagated to the relatively fragile display panel; thus, further excellent mechanical durability is attained.

It is preferable in a display apparatus according to a preferred embodiment to have a falling portion provided along at least a pair of opposed edges of the rigid plate, which falling portion projects toward the driving circuit board side of the rigid plate. Note that the shape of the rigid plate may be a trapezoid or a polygon, other than a rectangle and a square.

As such, the falling portion provided along the edges allows the rigid plate to serve as a fixed beam. Moreover, the rigid plate thus having at least one of the falling portion causes an increase in a second moment of area (geometrical moment of inertia) of the rigid plate. As a result, a deflection (bending) is reduced. The effect of the reduction of the deflection is sufficient as long as at least one of the falling portion and the rising portion is arranged along at least a pair of opposed edges of the rigid plate.

Moreover, the interaction improves between the front side viscoelastic layer, the front side hard layer, the back side viscoelastic layer, the back side hard layer, and the rigid plate. This effectively prevents breakage of the display panel. As a result, it is possible to provide a display apparatus which can reduce breakage of the display apparatus caused by a load placed on the display surface of the display panel and the impact at the time when the display apparatus is dropped.

It is preferable in a liquid crystal display device according to a preferred embodiment of the present invention to have a rising portion provided along at least a pair of opposed edges on the rigid plate, which rising portion projects toward an opposite side of the driving circuit board side.

According to a preferred embodiment of the present invention, the rising portion is provided along at least a pair of opposed edges of the rigid plate, which rising portion projects toward an opposite side of the driving circuit board side. This allows for a further increase in the second moment of area, which as a result reduces the deflection.

It is preferable for the rigid plate of the liquid crystal display device according to a preferred embodiment of the present invention to be formed in a rectangular or substantially rectangular shape. Note that a rectangular or substantially rectangular shape denotes a rectangle or a square, or a shape close to a rectangle or a square.

This makes it possible to provide a liquid crystal display device capable of reducing breakage caused by a load placed on the display surface of the liquid crystal display panel and an impact on the liquid crystal display device when dropped, in a case where the shape of the liquid crystal display device is of a common rectangle.

Moreover, it is preferable for the rigid plate of a liquid crystal display device according to a preferred embodiment of the present invention to be of a rectangular or substantially rectangular shape, and have both of the falling portion and the rising portion formed along each of four edges of the rigid plate.

According to a preferred embodiment of the present invention, the rigid plate is formed in a rectangular or substantially rectangular shape, and both the falling portion and rising portion are arranged along each of the four edges of the rigid plate.

Thus, both the falling portion and the rising portion are arranged on edges of an entire periphery of the rectangle. Therefore, the rigid plate serves as a fixed beam in transverse and longitudinal directions, and further the second moment of area is increased. Therefore, the deflection is further reduced.

As compared to a case where just one of the falling portion and the rising portion is provided along at least a pair of opposed edges of the rigid plate, deflection is further reduced in a case where both the falling portion and the rising portion are provided along the at least a pair of opposed edges of the rigid plate.

It is preferable for the rigid plate in a display apparatus according to a preferred embodiment of the present invention to be a metal plate.

Thus, a common metal plate may be readily used as the rigid plate, which metal plate allows easy processing of the falling portion. Hence, such a metal plate requires low cost. Further, the metal plate may be used for grounding the liquid crystal display device, which further allows adding of a heat releasing effect in response to heat generation from the driving circuit board and the backlight.

It is preferable for the metal plate in a display apparatus according to a preferred embodiment of the present invention to be made of aluminum alloy or magnesium alloy. Thus, reduction of weight and improvement in rigidity is possible.

The display apparatus according to a preferred embodiment of the present invention preferably includes a housing for housing the display panel, the rigid plate, and the driving circuit board, and at least one of an upper end of the rising portion and a lower end of the falling portion is arranged so as to be in contact with the housing.

Moreover, a display apparatus according to a preferred embodiment of the present invention preferably includes a housing for housing the display panel, the backlight, the rigid plate, and the driving circuit board, and at least one of an upper end of the rising portion and a lower end of the falling portion is arranged so as to be in contact with the housing.

That is to say, the rigid plate functions as the fixed beam by having at least one of the upper end of the rising portion and the lower end of the falling portion provided to be in contact with the housing. This allows reduction of the deflection. Moreover, an impact from a front or back side of the display apparatus is dispersed from the housing to the rigid plate that has high rigidity. Hence, breakage of the display apparatus is reduced.

The display apparatus according to a preferred embodiment of the present invention further preferably includes: a frame member for integrally supporting at least the rigid plate and the display panel; a housing for housing the display panel, the rigid plate, the driving circuit board, and the frame member; and at least one of an upper end of the rising portion and a lower end of the falling portion in the rigid plate, provided so as to be in contact with at least one of the frame member and the housing.

Moreover, the display apparatus according to a preferred embodiment of the present invention further preferably includes: a frame member for integrally supporting at least the rigid plate, the display panel and the backlight; a housing for housing the display panel, the backlight, the rigid plate, the driving circuit board, and the frame member; and at least one of an upper end of the rising portion and a lower end of the falling portion in the rigid plate, provided so as to be in contact with at least one of the frame member and the housing.

Thus, the frame member which integrally supports the rigid plate and at least the display panel, or which integrally supports the rigid plate and at least the display panel and the backlight may be used. This unique structure allows handling of the members as an integrated unit, which is a liquid crystal module. Moreover, the rigid plate functions as a fixed beam when at least one of the upper end of the rising portion and the lower end of the falling portion is in contact with at least one of the frame member and the housing. This allows reduction of the deflection. Moreover, the arrangement allows dispersion of an impact from the front or back side of the display apparatus, from the housing to the rigid plate having high rigidity, via the frame member. Hence, it is possible to reduce a possibility of breakage of the display apparatus.

Moreover, it is preferable for the backlight in the liquid crystal display device according to a preferred embodiment of the present invention to include a light guiding plate. This allows for reduction of thickness of the backlight.

In accordance with yet another preferred embodiment of the present invention, a portable electronic apparatus of the present invention includes the display device.

This provides a portable electronic apparatus or a stationary electronic apparatus including the display apparatus capable of reducing breakage caused by a load placed on the display surface of the display panel and impact on the display apparatus when dropped.

Each of the features of various preferred embodiments of the liquid crystal display device may be freely combined.

For a fuller understanding of the nature and advantages of preferred embodiments of the present invention, reference should be made to the ensuing detailed description taken in conjunction with the accompanying drawings.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 20 is an explanatory view illustrating a difference in a second moment of area between a flat plate and an H-shaped plate.

DETAILED DESCRIPTION OF THE PREFERRED EMBODIMENTS

First Preferred Embodiment

One preferred embodiment of the present invention is described below with reference to FIGS. 1 through 8. Note that this preferred embodiment does not limit the invention in any way.

Figure 2:
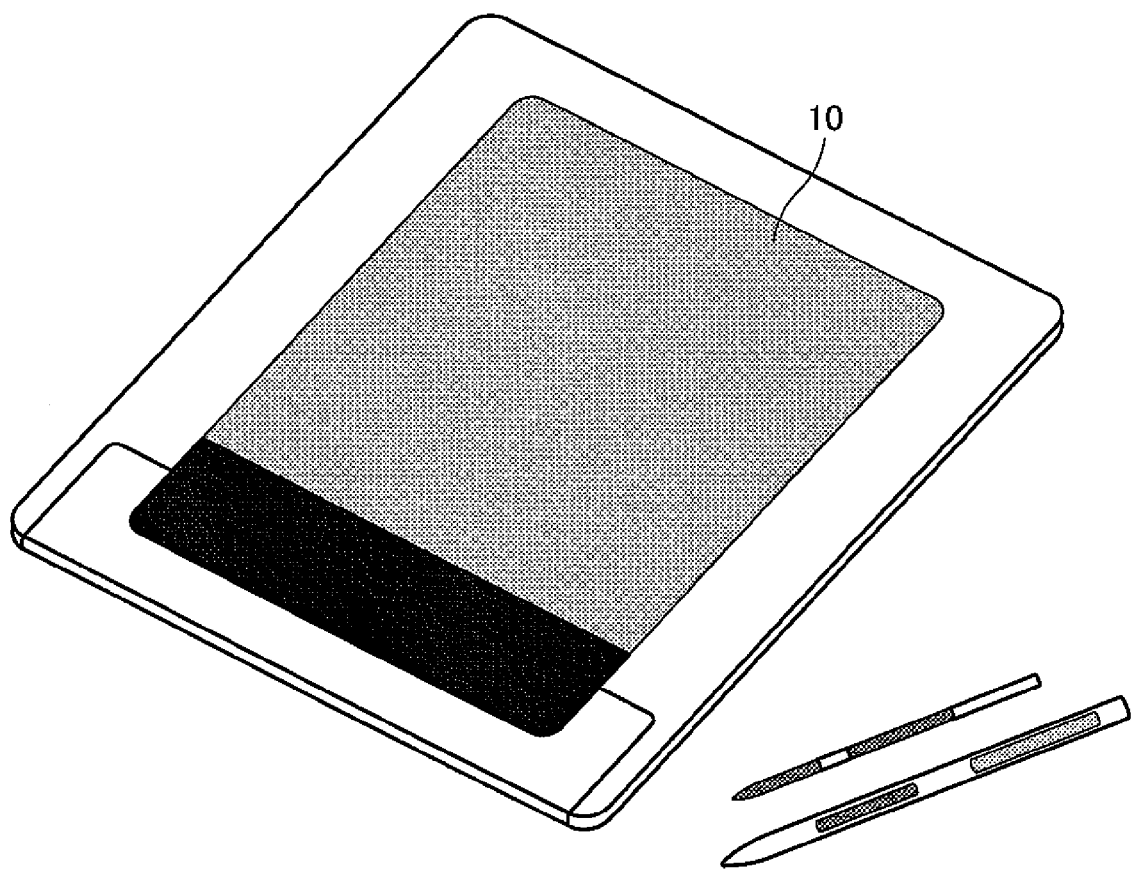
FIG. 2 is a perspective view illustrating a portable electronic apparatus including the liquid crystal display device.

A liquid crystal display device 10 as a display apparatus of the present preferred embodiment is, for example, incorporated in a portable electronic apparatus such as a tablet personal computer, as illustrated in FIG. 2. However, it is not necessarily limited to this, and the portable electronic apparatus may be, for example, a display for a notebook computer, an information mobile terminal (PDA: Personal Digital Assistant), or a mobile phone.

Figure 1:
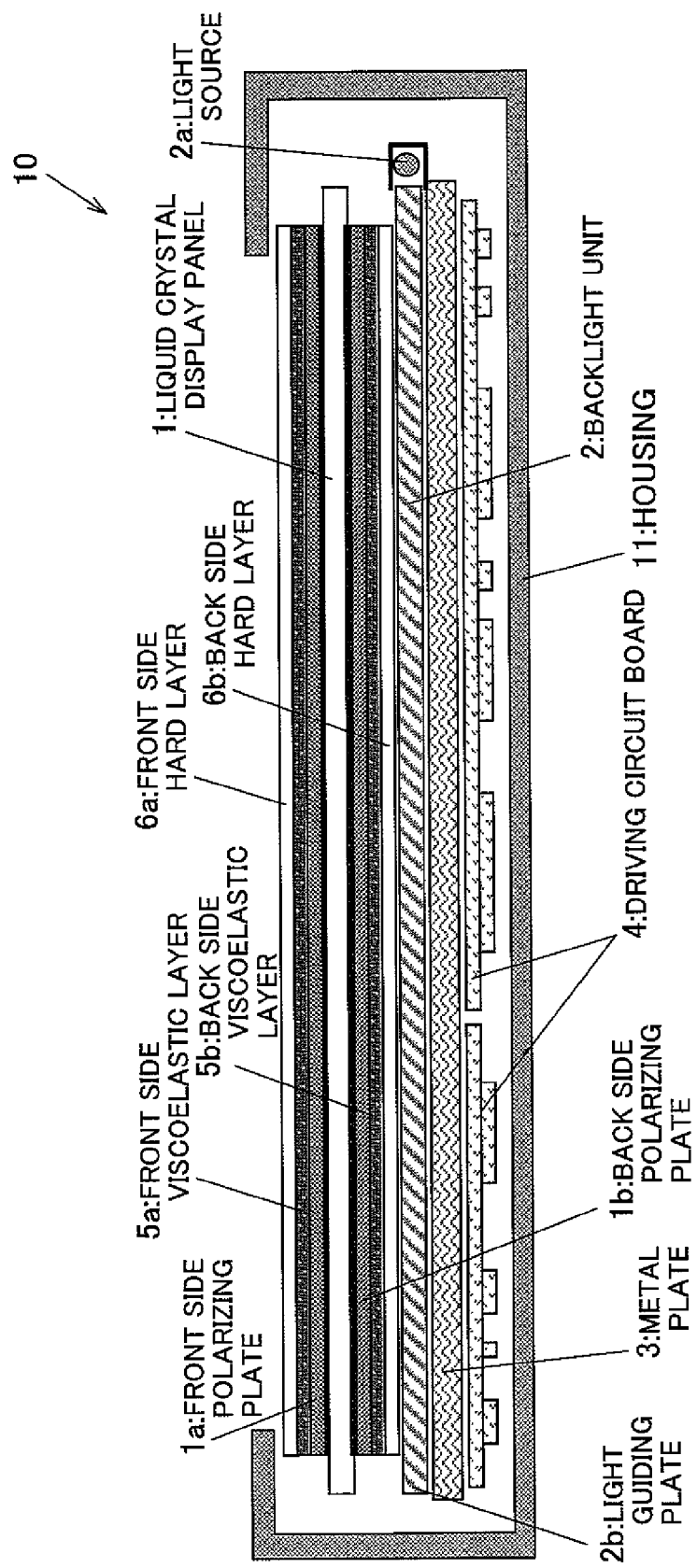
FIG. 1 is a cross sectional view illustrating a preferred embodiment of a liquid crystal display device of the present invention.

The following description describes an arrangement of the liquid crystal display device 10. FIG. 1 is a cross sectional view illustrating the arrangement of the liquid crystal display device 10.

The liquid crystal display device 10, as illustrated in FIG. 1 is, in brief, constructed by stacking, in order from top, a liquid crystal display panel 1 as a display panel, a backlight unit 2 as a backlight, a metal plate 3 as a plate made of rigid material, and a driving circuit board 4. In addition, a housing 11 is provided at an outermost section of such members.

The liquid crystal display panel 1 includes: an active matrix substrate in which thin film transistors not illustrated are provided in matrix form; an upper common electrode provided so as to face the active matrix substrate; and a liquid crystal layer which is sandwiched between pixel electrodes of the active matrix substrate and the upper common electrode. In addition, an alignment film is provided between the liquid crystal layer and the active matrix substrate, and between the liquid crystal layer and the upper common electrode. The active matrix substrate and a color filter substrate having the upper common electrode are each formed on a base material made of glass or the like. Moreover, a front side polarizing plate 1a and a back side polarizing plate 1b are adhered on outer sides of both the active matrix substrate and the color filter substrate, for polarizing light from a light source 2a of the backlight unit 2.

The liquid crystal display panel 1 controls alignment of liquid crystal by controlling a voltage, and carries out display by generating a transmitted amount of light which is emitted from the backlight unit 2 provided on a back side of the liquid crystal display panel 1. Note that the arrangement of the liquid crystal display panel 1 is just an example, and the arrangement of the liquid crystal display panel in the present invention is not limited whatsoever. For example, the liquid crystal display panel 1 may be a liquid crystal display panel of a passive matrix type.

The backlight unit 2 provided on the back side of the liquid crystal display panel 1 includes the light source 2a which is a light emitting body such as a fluorescent tube or an LED and a light guiding plate 2b which spreads the light emitted from the light source 2a to an entire surface of the liquid crystal display panel 1. The backlight unit 2 is not limited whatsoever, and may be, for example, an edge-light type or an area-light type.

The liquid crystal display device 10 requires a backlight unit since the liquid crystal display device 10 is transmissive. However, in a case where the liquid crystal display device 10 is a reflective type liquid crystal display device or a self-emission type display apparatus (for example, EL display apparatus, plasma display apparatus, or the like), the backlight unit 2 is not necessarily provided. Moreover, an optical sheet not illustrated may be provided between the liquid crystal display panel 1 and the light guiding plate 2b for evenly dispersing the light guided from the light guiding plate 2b, or for improving a light usage efficiency. Further, on a back side of the light guiding plate 2b, a reflection sheet not illustrated may be provided for improving usage efficiency of the light emitted from the light source 2a.

The metal plate 3 is preferably made of flat metal material such as aluminum alloy, magnesium alloy, titanium alloy, or SUS (stainless steel), and is shaped as a rectangle or substantially a rectangle. Metal is a material which has relatively high rigidity, therefore is suitable for the metal plate 3. Note that a square is included in a concept of a rectangle. This metal plate 3 is provided so as to cover a whole of a back surface of the backlight unit 2. The present invention is not necessarily limited to the metal plate 3, and may also be a plate made of other rigid material such as carbon resin or other hard ceramic material.

The driving circuit board 4 is provided on a back side of the metal plate 3 via an insulating sheet not illustrated. The driving circuit board 4 includes a circuit board for driving the liquid crystal display panel 1, a power supply, and a circuit board for driving a wireless system and another system, and is mounted with chip components such as an integrated circuit (IC), a coil, a resistance, a capacitance and the like. The driving circuit board 4 is packaged on one side only; and a flat surface thereof is positioned so as to be in contact with a back surface of the metal plate 3. In this case, it is preferable to screw the driving circuit board 4 together with the metal plate 3 by use of a screw (not illustrated), so as to improve rigidity of the driving circuit board 4, and to connect a GND of the driving circuit board 4 with the metal plate 3.

The housing 11 may be separated into two parts of a front housing 11a and a back housing 11b. A material of the housing 11 is not limited as long as a flexural rigidity is strong, and the material can guarantee the mechanical durability of the liquid crystal display device 10. For example, the housing may be formed of metal such as iron, aluminum, magnesium, or the like.

In the liquid crystal display device 10 of the present preferred embodiment, a front side viscoelastic layer 5a is stacked on the front side polarizing plate 1a of the liquid crystal display panel 1 as a first viscoelastic layer that is viscoelastic, and a front side hard layer 6a is stacked on the front side viscoelastic layer 5a as a first hard layer. On the other hand, a back side viscoelastic layer 5b is stacked on the back side polarizing plate 1b of the liquid crystal display panel 1 as a second viscoelastic layer that is viscoelastic, and a back side hard layer 6b is stacked on the back side viscoelastic layer 5b as a second hard layer. These layers are stacked so as to relax impact from an upper and lower side of the liquid crystal display panel 1.

Figure 3:
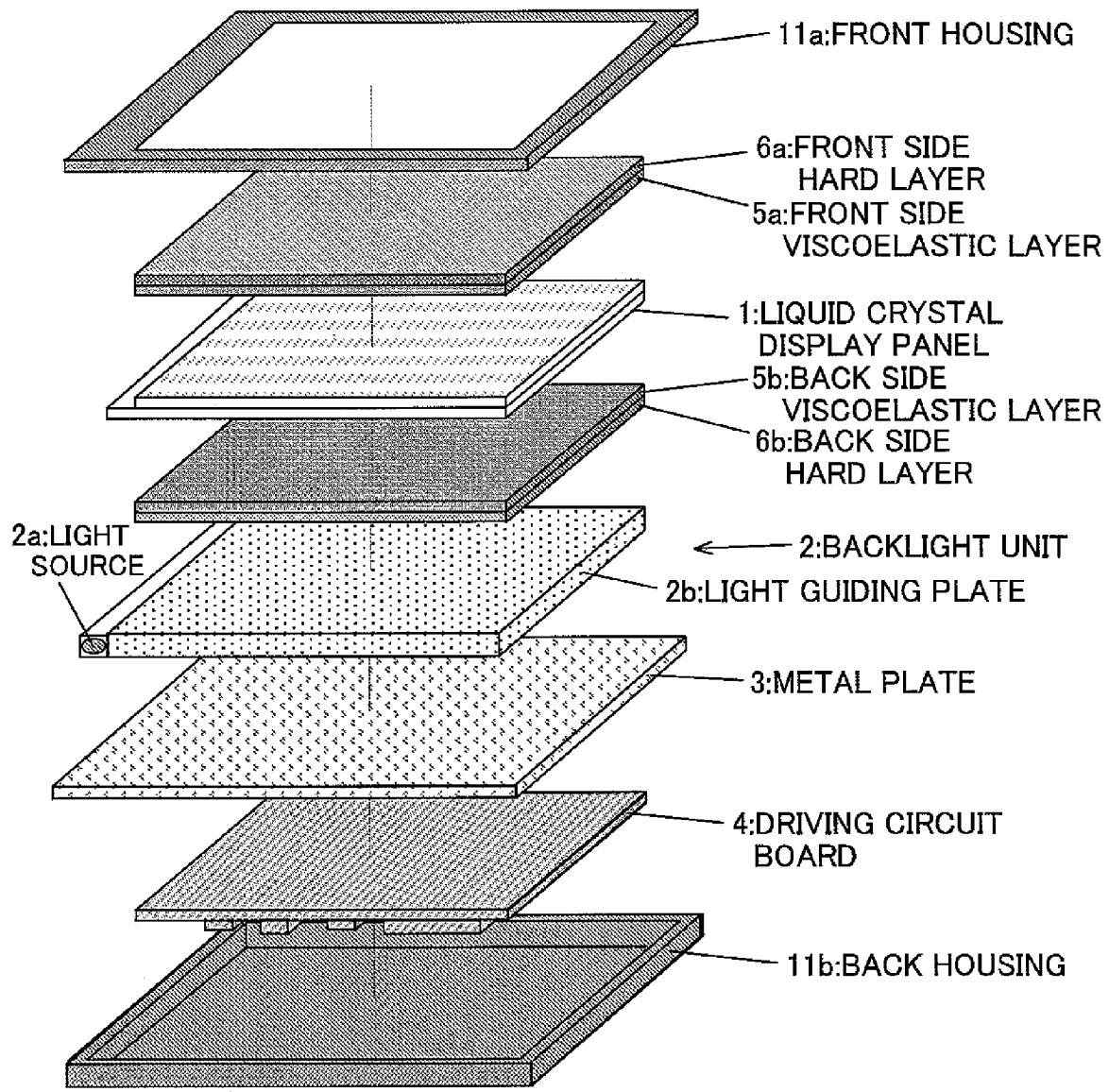
FIG. 3 is an exploded perspective view illustrating a method for fixing a metal plate and a driving circuit board of the liquid crystal display device.
Figure 4:
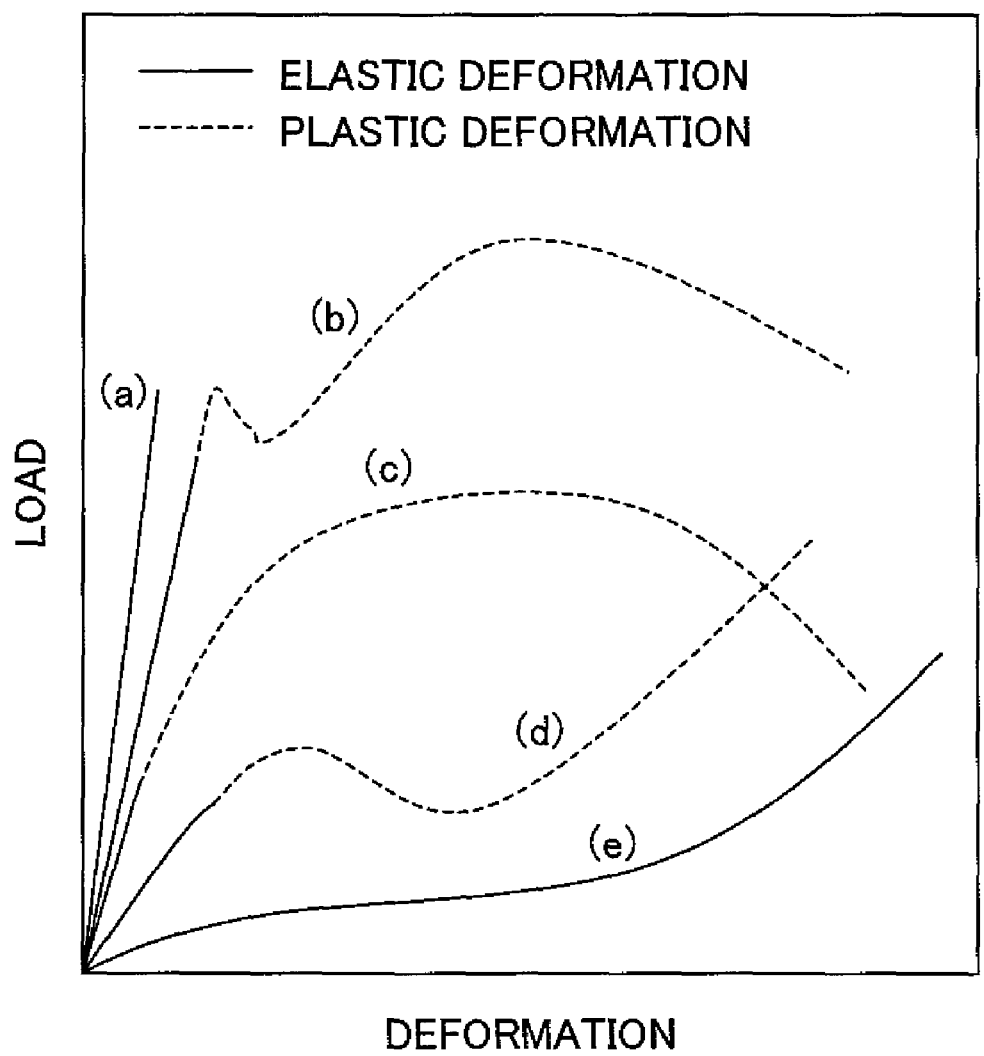
FIG. 4 is a graph showing a relationship between load and displacement.

Assembling of the liquid crystal display device 10 is carried out by first housing a stacked body of the driving circuit board 4, the metal plate 3, and the backlight unit 2 inside the back housing 11b, as illustrated in FIG. 3. Next, the liquid crystal display panel 1 which is stacked with the front side viscoelastic layer 5a and the front side hard layer 6a on its front side and the back side viscoelastic layer 5b and the back side hard layer 6b on its back side, is stacked on the backlight unit 2. Finally, the front housing 11a is placed thereon. The front housing 11a and the back housing 11b are connected to each other by, for example, a screw, in such a manner that an inverter, a control circuit and the like not illustrated are also included in the housing 11. The front housing 11a and the back housing 11b are arranged in an openable state. Moreover, the front surface housing 11a has an opening such that a display section of the liquid crystal display panel 1 is exposed.

This houses the liquid crystal display panel 1 in a state in which the liquid crystal display panel 1 is protected by the front side viscoelastic layer 5a and the front side hard layer 6a, and the back side viscoelastic layer 5b and the back side hard layer 6b.

The following description explains in detail of the front side viscoelastic layer 5a and front side hard layer 6a provided on a front side of the liquid crystal display panel 1, and the back side viscoelastic layer 5b and back side hard layer 6b provided on a back side of the liquid crystal display panel 1, each of which are characteristic arrangements of the liquid crystal display device 10 of the present embodiment.

The front side viscoelastic layer 5a is provided so as to cover an image displaying surface of the liquid crystal display panel 1, and the back side viscoelastic layer 5b is provided so as to cover a back surface of the liquid crystal display panel 1 opposite to the image displaying surface of the liquid crystal display panel 1. The front side viscoelastic layer 5a and the back side viscoelastic layer 5b have viscoelasticity. It is preferable for the front side viscoelastic layer 5a and the back side viscoelastic layer 5b to show a viscous behavior in which a relationship between external stimulus (e.g., stress, warp) and a response in regards to the stimulus can be explained by Voigt model (Kelvin model), Maxwell model or the like. "Viscoelastic" denotes a property which is both viscous and elastic. Members which are viscoelastic demonstrate (i) creep in which a warp generated by application of pressure increases over time, and (ii) stress relaxation in which stress decreases along with an elapse of time, and the like. Moreover, it is preferable for the relationship between the external stimulus (e.g., stress, warp) and the response in regards to the stimulus of the front side viscoelastic layer 5a to show a nonlinear elasticity behavior, as shown by the solid line (e) in FIG. 4.

Suitable material of such front side viscoelastic layer 5a and back side viscoelastic layer 5b is, for example, amorphous polymers such as ethylene methacrylic acid copolymer or elastomer.

The front side hard layer 6a and the back side hard layer 6b are elastic bodies which have higher modulus of elasticity than the front side viscoelastic layer 5a and the back side viscoelastic layer 5b. It is more preferable for the front side hard layer 6a and the back side hard layer 6b to show linear elasticity of which a deformation amount of the hard layers 6a and 6b effected by external force such as impact, bending or the like have linear correlation (changes in a manner of a linear function), and the deformation amount may be approximately modeled by Hooke's Law.

Examples of the suitable material for the front side hard layer 6a and the back side hard layer 6b encompass: acrylic resin such as PMMA (PolyMethyl MethAcrylate), polycarbonate resin (PC), triacetyl cellulose resin (TAC), ARTON (registered trademark) resin, and epoxy resin; and polyester resin such as polyethylene terephthalate resin (PET), polyimide resin, and polyamide resin.

The "linear elasticity" in the present specification denotes a state in which load to be applied and a displacement amount are in linear correlation (proportional relation), in a range of elastic deformation. On the other hand, "nonlinear elasticity" denotes a state in which the load to be applied and the displacement amount are not in the linear correlation (proportional relation), in the range of the elastic deformation.

The front side viscoelastic layer 5a and the front side hard layer 6a, and the back side viscoelastic layer 5b and the back side hard layer 6b each transmit light from the liquid crystal display panel 1. Therefore, it is preferable for the layers to have a high light transmittance.

The number of layers of the front side viscoelastic layer 5a and the front side hard layer 6a, and the back side viscoelastic layer 5b and the back side hard layer 6b is not limited to one layer each; the layers may be each arranged as a stacked body, and is not limited as long as the layers are arranged to have the arrangement as an elastic body/viscoelastic body on a display surface side. Additionally, no problems occur even if the viscoelastic body is arranged as a stacked body including a layer for adhesive use and a layer for absorption of impact.

Figure 5:
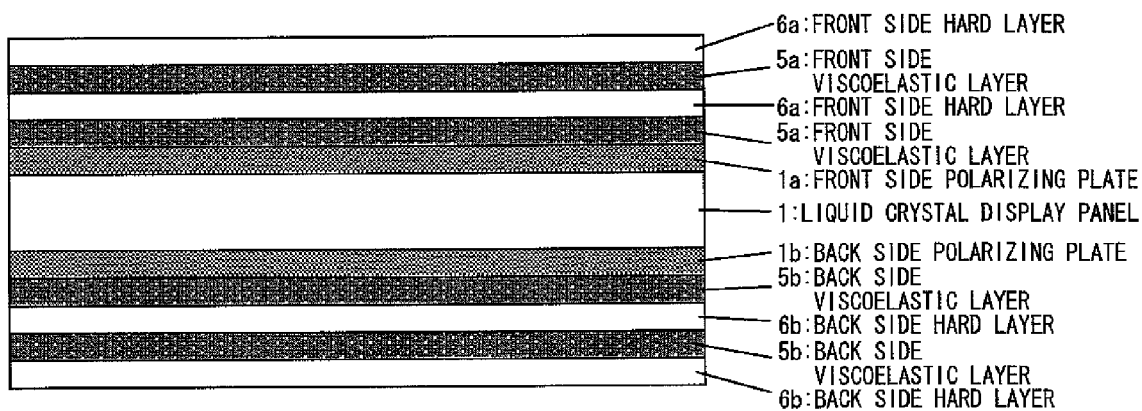
FIG. 5 is a cross sectional view illustrating an essential part of an arrangement of a modification of the liquid crystal display device.

For example, as illustrated in FIG. 5, it is possible to stack the front side polarizing plate 1a, the front side viscoelastic layer 5a, the front side hard layer 6a, the front side viscoelastic layer 5a, and the front side hard layer 6a in this order on a front side of the liquid crystal display panel 1, and to stack the back side polarizing plate 1b, the back side viscoelastic layer 5b, the back side hard layer 6b, the back side viscoelastic layer 5b, and the back side hard layer 6b in this order on the back side of the liquid crystal display panel 1.

Figure 6A:
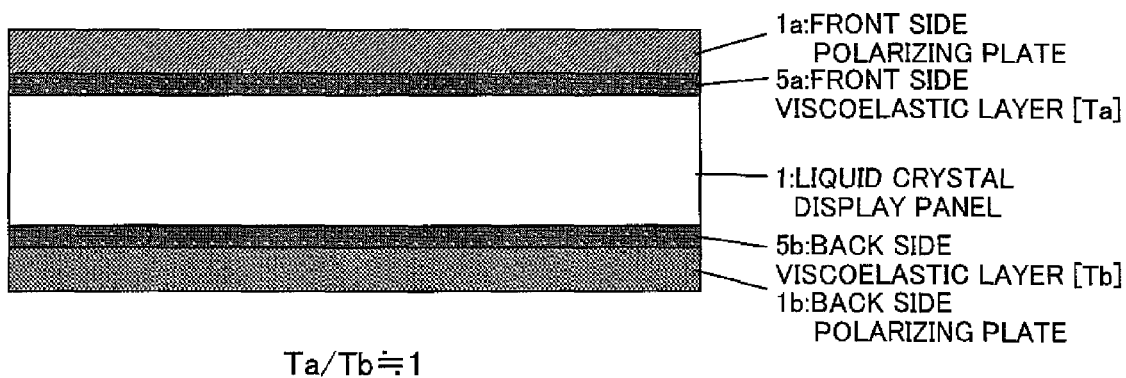
FIG. 6A is a cross sectional view illustrating an essential part of an arrangement of another modification of the liquid crystal display device.
Figure 6B:
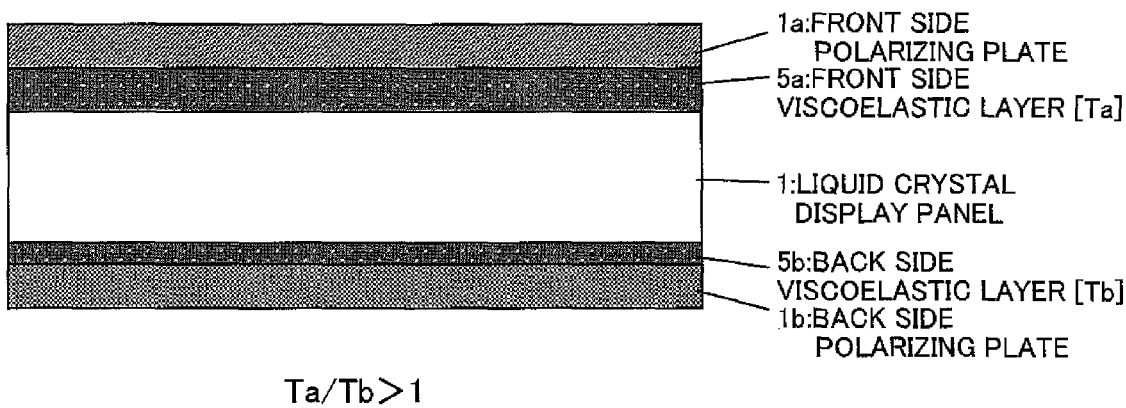
FIG. 6B is a cross sectional view illustrating an essential part of an arrangement of still another modification of the liquid crystal display device.

The front side polarizing plate 1a and the back side polarizing plate 1b that are used in the liquid crystal display panel 1 are made by, for example, stretching a film in which iodine is sandwiched between polyethylene terephthalate (PET) or the like. Therefore, as illustrated in FIGS. 6A and 6B, the front side polarizing plate 1a and the back side polarizing plate 1b may be used instead of the front side hard layer 6a and the back side hard layer 6b; the front side polarizing plate 1a may be adhered to the liquid crystal display panel 1 via the front side viscoelastic layer 5a, and the back side polarizing plate 1b may be adhered to the liquid crystal display panel 1 via the back side viscoelastic layer 5b. This thus allows the front side polarizing plate 1a and the back side polarizing plate 1b to have both an optical property and a mechanical property. This attains the reduction in thickness and cost.

The following description explains an effect of the metal plate 3.

The metal plate 3 is provided so as to obtain an impact relaxing property of the front side viscoelastic layer 5a, the front side hard layer 6a, the back side viscoelastic layer 5b and the back side hard layer 6b. That is, particularly in a case where the driving circuit board 4 is provided on the back side of the liquid crystal display device 10, the driving circuit board 4 is provided between the housing 11 and the liquid crystal display module. Consequently, in this case, the impact relaxing property can be obtained once the metal plate 3 is provided on a back surface of the liquid crystal display panel 1, in addition to providing the liquid crystal display panel 1 with the front side viscoelastic layer 5a, the front side hard layer 6a, the back side viscoelastic layer 5b and the back side hard layer 6b.

Further, it is more preferable for the driving circuit board 4 that is provided on the back surface of the metal plate 3 to have a flat arrangement on a side facing the metal plate 3.

The following description explains an effect attained by providing the metal plate 3.

Figure 22:
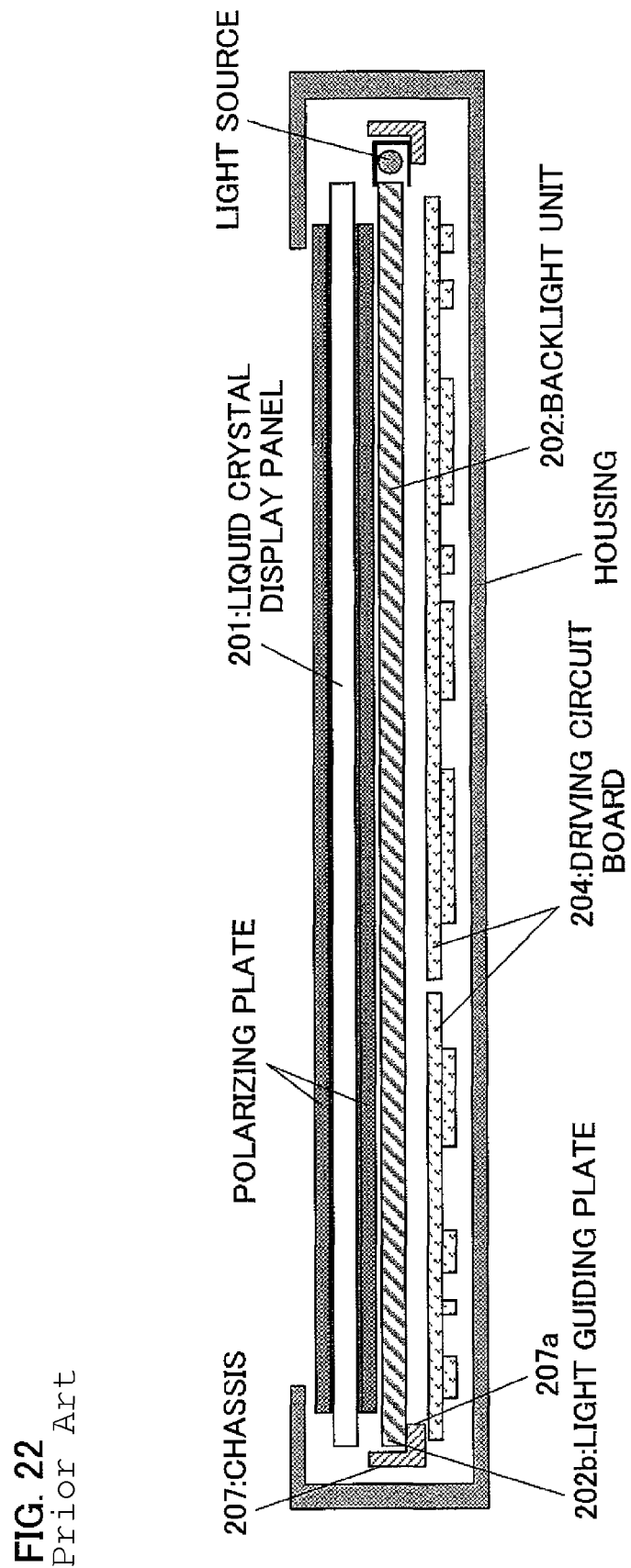
FIG. 22 is a cross sectional view illustrating an arrangement of another conventional liquid crystal display device.

That is to say, an ordinary liquid crystal display device has, as illustrated in FIG. 22 which is an explanatory view of a conventional liquid crystal display device, a backlight unit 202 which is provided on a back side of a liquid crystal display panel 201, and a driving circuit board 204 provided on a back side of the backlight 202. Therefore, when an impact is applied on a display surface of the liquid crystal display panel 201, the liquid crystal display panel 201 warps. This causes a possibility that the liquid crystal display panel 201 may break. As a measure against this problem, inventors of the present application tried an arrangement in which the front side viscoelastic layer 5a and the front side hard layer 6a are provided on just a front side of the liquid crystal display panel 201 for a purpose of absorbing the impact on the front side of the liquid crystal display panel 1, as described in Japanese Unexamined Patent Publication No. 266759/2001 (Tokukai 2001-266759). However, the liquid crystal display panel 201 broke relatively easily.

Further, in line with the recent reduction in thickness and weight, the thickness of the liquid crystal display panel 1 and the light guiding plate 2b have become thin. As a result, it is difficult to obtain a sufficient rigidity. A measure against this is the arrangement of the present preferred embodiment, which provides the metal plate 3 on the back side of the liquid crystal display panel 1. This arrangement enables obtainment of sufficient rigidity, although the arrangement is thinner than that of thickening the thickness of the liquid crystal display panel 1 and the light guiding plate 2b. Thus, it is possible to suppress the warp of the liquid crystal display panel 1.

That is to say, an arrangement of an unbreakable liquid crystal display device 10 is attained once the metal plate 3 is provided on a back side of the liquid crystal display panel 1, and an impact absorption on the front side viscoelastic layer 5a and the front side hard layer 6a is used in combination with the metal plate 3.

A transmissive type or a transflective type module requires having the back side polarizing plate 1b and the light guiding plate 2b on the back side of the liquid crystal display panel 1. In this case, the back side viscoelastic layer 5b and the back side hard layer 6b are provided between the metal plate 3 and the liquid crystal display panel 1. So far, Japanese Unexamined Patent Publication No. 266759/2001 (Tokukai 2001-266759) and the like have basically considered adoption of the arrangement to a PDP (plasma display panel). Therefore, an arrangement which has an adhesive layer on a back surface has not been considered. The present inventors have found an arrangement which obtains the properties required in providing an adhesive layer and a hard layer on a back surface of the panel.

Figure 7:
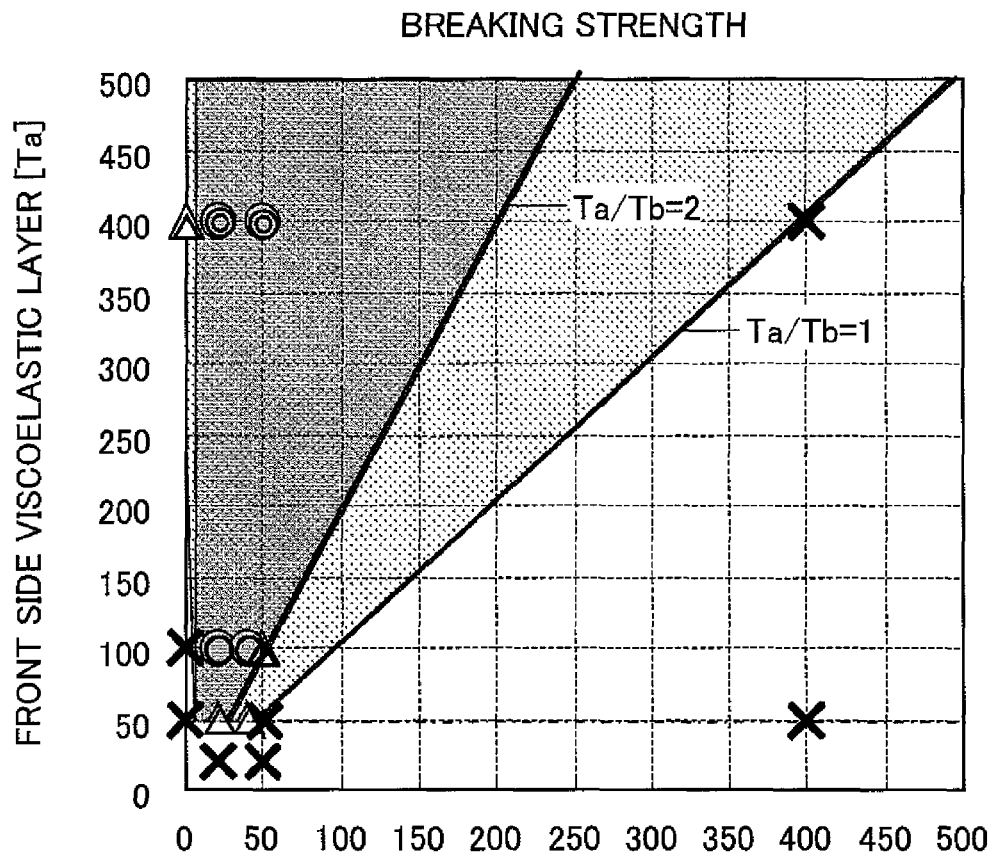
FIG. 7 is a graph showing a relationship between breakage of a liquid crystal display device and thicknesses of a front side viscoelastic layer and a back side viscoelastic layer.

A viscoelastic body of the back side viscoelastic layer 5b absorbs and disperses impact. Therefore, this gives an impression that a thicker back side viscoelastic layer 5b is more effective, even for the back side of the liquid crystal panel 1. However, that is not the case. In order to obtain an impact-resistance property, the back side viscoelastic layer 5b on the back side is required to be thinner than the front side viscoelastic layer 5a on the display surface side of the liquid crystal display panel 1. However, if the back side viscoelastic layer 5b is not provided, the liquid crystal display panel 1 readily breaks. On the other hand, the liquid crystal display panel 1 readily breaks also if the back side viscoelastic layer 5b is thicker than the front side viscoelastic layer 5a. Consequently, the back side viscoelastic layer 5b provided on the back side of the liquid crystal display panel 1 and having a thickness Tb requires to satisfy a condition as follows as shown in FIG. 7:

$$0\ \mu m < Tb,\ \text{and}\ Ta/Tb > 1,$$

where Ta denotes a thickness of the front side viscoelastic layer 5a. The thickness Tb further preferably satisfies:

$$0\ \mu m < Tb,\ \text{and}\ Ta/Tb > 2.$$

Note that this result is calculated from Example later described.

Next is an explanation regarding the high mechanical durability of the liquid crystal display device 10 of the present embodiment, with reference to drawings.

As described above, the front side viscoelastic layer 5a is viscoelastic, and a warp r(t) at a time t while a specific stress σ is applied to the front side viscoelastic layer 5a is represented by Formula (1) as follows:

$$r(t) = (\sigma/E) \times (1 - e^{-Et/\eta}) \quad \text{Formula (1)}$$

where E denotes modulus of elasticity; and η denotes coefficient of viscosity.

Moreover, a delay time τ is represented by an equation of the following Formula (2). Hence, Formula (3) is obtained by substituting Formula (2) into Formula (1).

$$\tau = \eta/E \quad \text{Formula (2)}$$

$$r(t) = (\sigma/E) \times (1 - e^{-t/\tau}) \quad \text{Formula (3)}$$

In a case where there is no dashpot (damper) (η=0), that is, when the delay time τ is 0, just a momentary elastic deformation occurs. In comparison, in a case where the dashpot is connected in parallel as like the Voigt model, and there is the coefficient of viscosity of η, the delay time (τ) increases along with an increase in the coefficient of viscosity η, in Formula (2).

As a result, as seen from Formula (3), the momentary warp r(t) is suppressed, and externally applied stress (particularly stress that is momentarily applied, namely impact) is relaxed and suppressed. Therefore, external stress and impact that is propagated to the relatively fragile liquid crystal display panel 1 is effectively suppressed, which allows attainment of a further excellent mechanical durability.

Moreover, the front side hard layer 6a that has a high modulus of elasticity is provided on the front side viscoelastic layer 5a. Therefore, when stress is applied externally, restoring force, namely, repulsive force is generated in the front side hard layer 6a. Therefore, the external stress is relaxed and dispersed toward a surface of the liquid crystal display panel 1. As a result, the stress on the relatively fragile liquid crystal display panel 1 is effectively suppressed, which allows attainment of a further excellent mechanical durability.

As described above, the front side viscoelastic layer 5a attains a great effect in response to momentarily applied stress. However, not much of a delay effect given by the front side viscoelastic layer 5a is attained in response to stress that is slowly applied. This stress that is slowly applied can be relaxed and dispersed by providing the front side hard layer 6a on the front side viscoelastic layer 5a as in the liquid crystal display device 10. The following description explains a principle of this.

In a case where the stress is slowly applied, the front side hard layer 6a that has the high modulus of elasticity propagates stress that is applied to a whole of the front side viscoelastic layer 5a in a dispersing manner, without the front side hard layer 6a largely deforming in shape. Therefore, it is possible to effectively relax and disperse the stress that is propagated to the liquid crystal display panel 1 via the front side viscoelastic layer 5a. As a result, the stress propagated to the relatively fragile liquid crystal display panel 1 is effectively suppressed, which allows an attainment of an excellent mechanical durability.

The effect of the front side viscoelastic layer 5a and the front side hard layer 6a on the display surface side of the liquid crystal display panel 1 is as described above. However, since the liquid crystal display panel 1 is of a fragile material made of glass, suppressing of a partial warp is required, more than the suppressing of the stress. Particularly, due to the recent trend of reducing thickness and weight of the liquid crystal display device, the glass thickness and the light guiding plate 2b are becoming thinner in thickness, so as to reduce weight and thickness.

In response to this, how the partial warp of the liquid crystal display panel 1 is prevented becomes an important factor. As a method for this, a metal plate 3 is provided between the light guiding plate 2b and the driving circuit board 4. This evens a warp that is generated partially on the liquid crystal display panel 1, which partial warp is caused by the liquid crystal display panel 1 warping along a step or the like of the driving circuit board 4. Hence, the liquid crystal display device is arranged such that the liquid crystal display panel 1 does not partially deform, in other words, is difficult to break.

Figure 8A:
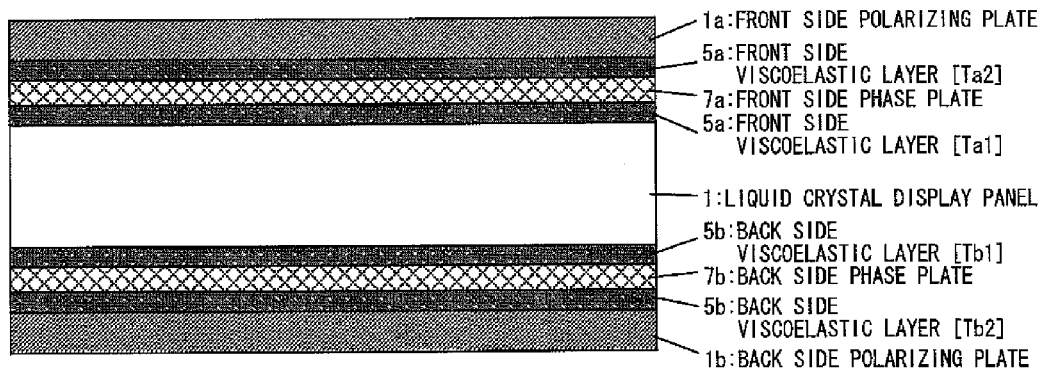
FIG. 8A is a cross sectional view illustrating an essential part of an arrangement of still another modification of the liquid crystal display device.
Figure 8B:
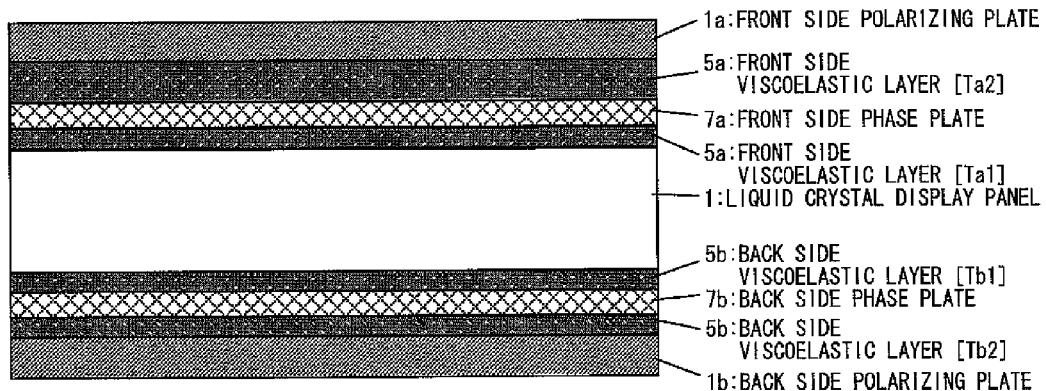
FIG. 8B is a cross sectional view illustrating an essential part of an arrangement of still another modification of the liquid crystal display device.

The present preferred embodiment explains the liquid crystal display device that has the backlight unit 2, however the backlight unit 2 is not necessarily provided in a case where the liquid crystal display device is of a reflective type, a self-emission type display device (e.g., EL display device, plasma display device), or the like. This is because an important factor of the liquid crystal display device is that a back surface of a panel is flat and rigid. Further, as illustrated in FIGS. 8A and 8B, the liquid crystal display device may be one which optical films such as the front side polarizing plate 1a and the front side phase plate 7a are stacked on or under the front side viscoelastic layer 5a or the front side hard layer 6a, or one which optical films such as the back side polarizing plate 1b and the back side phase plate 7b are stacked on or under the back side viscoelastic layer 5b or the back side hard layer 6b. Moreover, the optical films such as the polarizing plate and the phase plate may be used as a substitute of the front side hard layer 6a or the back side hard layer 6b, as illustrated in FIGS. 8A and 8B.

Further, a surface of the front side polarizing plate 1a may be processed so as to prevent reflection, electric charging or the like. Such surface processing does not effect the attainment of the mechanical durability; hence there is no problem in carrying out the surface processing.

As such, in the liquid crystal display device 10 of the present preferred embodiment, both sides of the liquid crystal display panel 1 are protected by: the front side viscoelastic layer 5a that is viscoelastic and covers a display surface of the liquid crystal display panel 1; the front side hard layer 6a that has higher modulus of elasticity than the front side viscoelastic layer 5a and covers the front side viscoelastic layer 5a; the back side viscoelastic layer 5b that is viscoelastic and covers a back surface of the liquid crystal display panel 1; and the back surface hard layer 6b that has higher modulus of elasticity than the back side viscoelastic layer 5b and covers the back side viscoelastic layer 5b.

That is to say, in the present preferred embodiment, the front side viscoelastic layer 5a is sandwiched between the liquid crystal display panel 1 and the front side hard layer 6a, and the back side hard layer 6b is sandwiched between the liquid crystal display panel 1 and the back side hard layer 6b, which front and back side viscoelastic layers 5a and 5b are not just a simple adhesive layer. Consequently, the front side viscoelastic layer 5a and the back side viscoelastic layer 5b suppress momentary warp. Hence, externally applied stress, particularly stress that is momentarily applied (i.e., impact), is relaxed and suppressed. As a result, external stress and impact that are propagated to a relatively fragile display panel are effectively suppressed; thus, excellent mechanical durability is attained.

The front side hard layer 6a having the high modulus of elasticity is provided on the front side viscoelastic layer 5a, and the back side hard layer 6b having the high modulus of elasticity is provided on the back side viscoelastic layer 6a. Hence, when external stress is applied, restoring force, that is, repulsive force is generated on the front side hard layer 6a and the back side hard layer 6b. Consequently, the external stress is relaxed and dispersed towards a front or back surface of the liquid crystal display panel 1. As a result, it is possible to effectively suppress the stress that is to be propagated to the relatively fragile liquid crystal display panel 1. This allows attainment of a further excellent mechanical durability of the liquid crystal display device 10.

In the present preferred embodiment, a metal plate 3 is provided between the backlight unit 2 and the driving circuit board 4, which metal plate 3 has a plane surface of a broader area than that of the backlight unit 2. Consequently, the whole of the backlight unit 2 is supported by a surface of the metal plate 3. Therefore, even if a load is placed on an upper side of the liquid crystal display panel 1, the backlight unit 2 does not bend at an edge of the metal plate 3.

Breakage of the display panel is prevented by an interaction of the front side viscoelastic layer, the front side hard layer, the back side viscoelastic layer, the back side hard layer, and the metal plate 3.

Further, it has been demonstrated that durability of the liquid crystal display panel 1 is improved, by carrying out an impact experiment in which a rigid ball having a diameter of approximately 4 cm and a weight of approximately 200 g is dropped from a height of about 30 cm, where the back side viscoelastic layer 5b has a thickness Tb of not less than about 20 μm, and the front side viscoelastic layer 5a having a thickness Ta at that time satisfies: Ta/Tb>1 (Tb≠0).

This provides a liquid crystal display device 10 which has high mechanical durability, and which can reduce breakage caused by a load placed on the display surface of the liquid crystal display panel 1 and an impact when dropped.

In the liquid crystal display device 10 of the present preferred embodiment, the thickness Ta of the front side viscoelastic layer 5a and the thickness Tb of the back side viscoelastic layer 5b preferably satisfies:

$$Ta/Tb>2(Tb\neq 0).$$

This ensures providing of a liquid crystal display device 10 that has the high mechanical durability, due to reduction of breakage caused by a load placed on the display surface of the liquid crystal display panel 1 and an impact at a time when the liquid crystal display device 10 is dropped.

In the liquid crystal display device 10 of the present preferred embodiment, the thickness Ta of the front side viscoelastic layer 5a preferably satisfies: Ta≧50 μm. This softens an impact on the front side of the liquid crystal display panel 1, which as a result prevents breakage of the front side of the display panel.

In the liquid crystal display device 10 of the present preferred embodiment, the thickness Tb of the back side viscoelastic layer 5b preferably satisfies:

$$20\ \mu m \leq Tb \leq 50\ \mu m.$$

This allows formation of the back side viscoelastic layer 5b having a same thickness as a common adhesive layer.

In the liquid crystal display device 10 of the present preferred embodiment, it is preferable for at least one of the front side hard layer 6a and the back side hard layer 6b to be a polarizing plate.

This allows a polarizing plate used in the liquid crystal display panel 1 to be used as the at least one of the front side hard layer 6a and the back side hard layer 6b.

Moreover, in the liquid crystal display device 10 of the present preferred embodiment, it is preferable for at least one of the front side hard layer 6a and the back side hard layer 6b to be a phase plate.

This allows the front side phase plate 7a and the back side phase plate 7b used for optical compensation in the liquid crystal display panel 1 to be used as at least one of the front side hard layer 6a and the back side hard layer 6b.

In the liquid crystal display device 10 of the present preferred embodiment, momentary warp is suppressed in the front side viscoelastic layer 5a and the back side viscoelastic layer 5b due to nonlinear elasticity. Hence, externally applied stress, particularly stress that is momentarily applied (i.e., impact), is relaxed and suppressed. As a result, the external stress and impact that are propagated to the relatively fragile display panel are effectively suppressed; thus, excellent mechanical durability is attained.

Moreover, the front side hard layer 6a and the back side hard layer 6b have linear elasticity; when external stress is applied, the restoring force, that is, repulsive force is positively generated in the front side hard layer 6a and the back side hard layer 6b. Therefore, externally applied stress is relaxed and dispersed toward the front or back side of the liquid crystal display panel 1. As a result, it is possible to positively and effectively suppress the stress that is propagated to the relatively fragile liquid crystal display panel 1; thus, further excellent mechanical durability is attained.

EXAMPLE

The present example carried out a verification experiment for verifying a relationship between breakage and a thickness of the front side viscoelastic layer 5a and the back side viscoelastic layer 5b, of the liquid crystal display panel 1 of First Preferred Embodiment.

A result thereof is shown in Table 1. Note that, the present experiment introduces a case of an arrangement in which a front side polarizing plate 1a is used instead of the front side hard layer 6a, and a back side polarizing plate 1b is used instead of the back side hard layer 6b, as illustrated in FIGS. 6A and 6B.

TABLE 1

| | Front side viscoelastic layer [Ta] [μm] | Back side viscoelastic layer [Tb] [μm] | Breakage of Panel |
| --- | --- | --- | --- |
| Comparative Example 1 | 20-100 | 0 | X |
| Comparative Example 2 | 400 | 0 | Δ |
| Comparative Example 3 | 20 | 20-40 | X |
| Example 1 | 50 | 20-40 | Δ |
| Comparative Example 4 | 50 | 50 | X |
| Example 2 | 100 | 20-40 | ○ |
| Example 3 | 100 | 50 | Δ |
| Example 4 | 400 | 20-50 | ⊚ |
| Comparative Example 5 | 50 | 400 | X |
| Comparative Example 6 | 400 | 400 | X |

The front side polarizing plate 1a used as the front side hard layer and the back side polarizing plate 1b used as the back side hard layer in the experiment each had a thickness of about 300 μm, for example, and as the metal plate 3 that is to be provided, magnesium alloy having a thickness of about 600 μm, for example, was used. A ball having a weight of about 200 g, for example, was dropped on the layers thus assembled, and it was observed whether or not the liquid crystal display panel 1 broke. More specifically, it was observed whether or not the liquid crystal display panel 1 broke when a rigid ball having a diameter of about 36.6 mm and a weight of about 200 g was dropped from a height of about 30 cm, for example.

The following shows a verification result in a case where the front side viscoelastic layer 5a had a thickness Ta in a range of about 20 μm to about 400 μm, for example.

First, the thickness Ta of the front side viscoelastic layer 5a was provided in a range of 20 μm to 100 μm, as shown in Comparative Example in Table 1, and verification was carried out. As a result, the liquid crystal display panel 1 easily broke. A result of Comparative Example 2 shown in Table 1 in which the thickness Ta of the front side viscoelastic layer 5a was provided as 400 μm and having no back side viscoelastic layer 5b resulted in breakage of the liquid crystal display panel 1. However, a degree of breakage was lower than that of Comparative Example 1.

Next shows a verification result of a case where the back side viscoelastic layer 5b and the front side viscoelastic layer 5a were provided so as to have a thickness Tb in a range of about 20 μm to about 40 μm, and the thickness Ta of the front side viscoelastic layer 5a in a range of about 20 μm to about 400 μm, for example.

Verification of the front side viscoelastic layer 5a having a thickness of 20 μm as shown in Comparative Example 3 resulted such that the liquid crystal display panel 1 easily broke. On the other hand, in a result of Example 1 in which the back side viscoelastic layer 5b was provided having the thickness Tb as similar as Comparative Example 3, that is in a range of about 20 μm to about 40 μm, and the front side viscoelastic layer 5a was provided having the thickness Ta of about 50 μm, for example, the degree of the breakage was lower than that of Comparative Example 1 although the liquid crystal display panel 1 did break.

In a case where the thickness Ta of the front side viscoelastic layer 5a was about 100 μm, for example, as shown in Example 2, the liquid crystal display panel 1 excelled in an impact-resistant property. In a case where the thickness Ta of the front side viscoelastic layer 5a was about 400 μm, for example, as shown in Example 4, the impact-resistant property excelled even further.

Next, the back side viscoelastic layer 5b was provided having the thickness Tb of 50 μm, and the front side viscoelastic layer 5a was provided having the thickness Ta in a range of 50 μm to 400 μm. As a result of the verification, in a case where the thickness Ta of the front side viscoelastic layer 5a was 50 μm as shown in Comparative Example 4, the liquid crystal display panel 1 easily broke. On the other hand, in a case where the thickness Ta of the front side viscoelastic layer 5a was about 100 μm, for example, as shown as Example 3, the liquid crystal display panel 1 excelled in impact-resistant property, and in a case where the thickness Ta of the front side viscoelastic layer 5a was about 400 μm, for example, as shown as Example 4, the impact-resistant property excelled even further.

Next, the back side viscoelastic layer 5b was provided having the thickness Tb of 400 μm and the front side viscoelastic layer 5a was provided having the thickness Ta in a range of 50 μm to 400 μm, and verification of this liquid crystal display panel 1 was carried out. As a result, as shown in Comparative Examples 5 and 6, the liquid crystal panel 1 easily broke.

As from these verification results, it was found that the greater the thickness Ta of the front side viscoelastic layer 5a is, the more difficult the liquid crystal display panel 1 is to break. In addition, it was further found that the liquid crystal display panel 1 easily breaks also in the case where there is no thickness Tb of the back side viscoelastic layer 5b (Tb=0 μm). Additionally, it was found that the liquid crystal display panel 1 easily breaks when Ta divided by Tb is equal to or less than 1 (for example, when Ta=50 μm, Tb=50 μm; when Ta=400 μm, Tb=400 μm; and further when Ta=50 μm, Tb=400 μm). Namely, when Ta and Tb satisfy Ta/Tb≦1, the liquid crystal display panel 1 easily breaks even if the front side viscoelastic layer 5a is thick, for example, about 400 μm, as in Comparative Examples 6 and 7. That is to say, it was found that the impact-resistant property effect can only be demonstrated when the thickness Tb of the back side viscoelastic layer 5b satisfies: 0 μm<Tb<Ta.

Moreover, from the experiment, it was found that the thickness Ta of the front side viscoelastic layer 5a preferably satisfies:

Ta≧50.

In a case where Ta is thinner than about 50 μm, dispersion and absorbing ability of the impact force by the front side viscoelastic layer 5a is low. Thus, the impact force propagated to the glass of the liquid crystal display panel 1 is strong. As a result, the effect cannot be demonstrated.

The thickness Ta of the front side viscoelastic layer 5a is preferably not more than about 1000 μm from a view of evenness, productivity, transmissivity, and costs. However, from a view of impact-resistant property, the thickness Ta may be even thicker.

The present Example explained an arrangement in which the front side polarizing plate 1a also serves as the front side hard layer 6a and the back side polarizing plate 1b also serves as the back side polarizing plate 1b. It is verified that a same effect is attainable even in a case where there is no member that serves as a double purpose, by providing a front side viscoelastic layer 5a and a back side viscoelastic layer 5b, which have a thickness of approximately 20 μm. The case where there is no member that serves as a double purpose is a case where a plate-shaped rigid body is provided on the back surface of the liquid crystal display panel 1, for example a reflective type liquid crystal panel, an EL panel, a PDP panel, or the like.

On contrary, it has been verified that the effects of the front side viscoelastic layer 5a and the front side hard layer 6a that are provided on the display surface side are demonstrated in an arrangement in which the back side viscoelastic layer 5b and the back side hard layer 6b are included, and the thickness Tb of the back side viscoelastic layer 5b satisfies:

0 μm<Tb, and Ta/Tb>1.

This allows obtainment of the impact-resistant property.

Second Preferred Embodiment

Another preferred embodiment of the present invention is described below with reference to FIGS. 9 through 20. Note that, arrangements other than what is explained in the present preferred embodiment is identical to First Preferred Embodiment. For convenience, members which have identical functions to the members illustrated in drawings of First Preferred Embodiment have identical reference numerals, and explanations thereof are omitted.

A liquid crystal display device 20 of the present preferred embodiment, in addition to the arrangement of the liquid crystal display device 10 of First Preferred Embodiment, is provided with a falling portion 3a and a rising portion 3b along a periphery of a metal plate 3. A lower end of the falling portion 3a and an upper end of the rising portion 3b are in contact with or are fixed to a housing 11 of the liquid crystal display device 20 so that the metal plate 3 does not readily warp, even if a metal plate 3 of a same thickness is used. Therefore, breakage of the liquid crystal display panel 1 is also prevented and minimized.

The following description explains a characteristic of an arrangement of the liquid crystal display device 20.

The present preferred embodiment first eliminates steps on a back side of the liquid crystal display device 20, and improves a rigidity of the back side of the liquid crystal display device 20 while reducing thickness and weight of the liquid crystal display device 20. This enables an arrangement in which the liquid crystal display panel 1 placed on an upper side of the liquid crystal display device 20 is difficult to be bent. More specifically, the step 207a on the back side of the liquid crystal display device is eliminated by eliminating the conventionally provided chassis 207 illustrated in FIG. 22.

Moreover, the metal plate 3 provided on the back side of the liquid crystal display device 20 preferably is a rectangular or substantially rectangular plate made of rigid material which has a plane surface of a broader area than that of the light guiding plate 2b; and the backlight unit 2 including the light source 2a is supported by a flat surface of the metal plate 3. Further, both a falling portion 3a and a rising portion 3b are arranged on edges of the metal plate 3. The rising portion 3b projects upper than the display surface of the liquid crystal display panel 1. The falling portion 3a extends lower than a back surface of the driving circuit board 4. Such arrangement allows providing the driving circuit board 4 without forming a step under the light guiding plate 2b.

Figure 11:
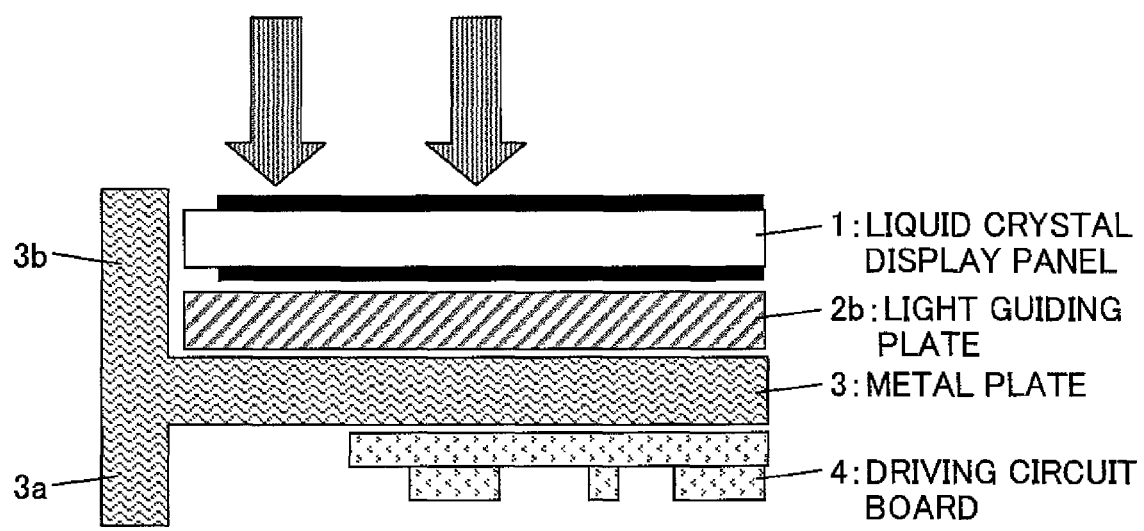
FIG. 11 is a cross sectional view illustrating an arrangement of the liquid crystal display device when a load is placed on the liquid crystal display device from an upper side of a liquid crystal display panel.

As a result, as illustrated in FIG. 11, even if a load is applied from a surface side of the liquid crystal display panel 1, a portion of the light guiding plate 2b of the backlight unit 2 does not bend. Moreover, an impact on the liquid crystal display device when dropped in a state in which the display surface of the liquid crystal display panel 1 is facing downwards is received by the outer periphery of the metal plate 3. This allows dispersion of the impact. The falling portion 3a and the rising portion 3b may be made of GFRP (Glass Fiber Reinforced Plastics) or the like if necessary.

Figure 10:
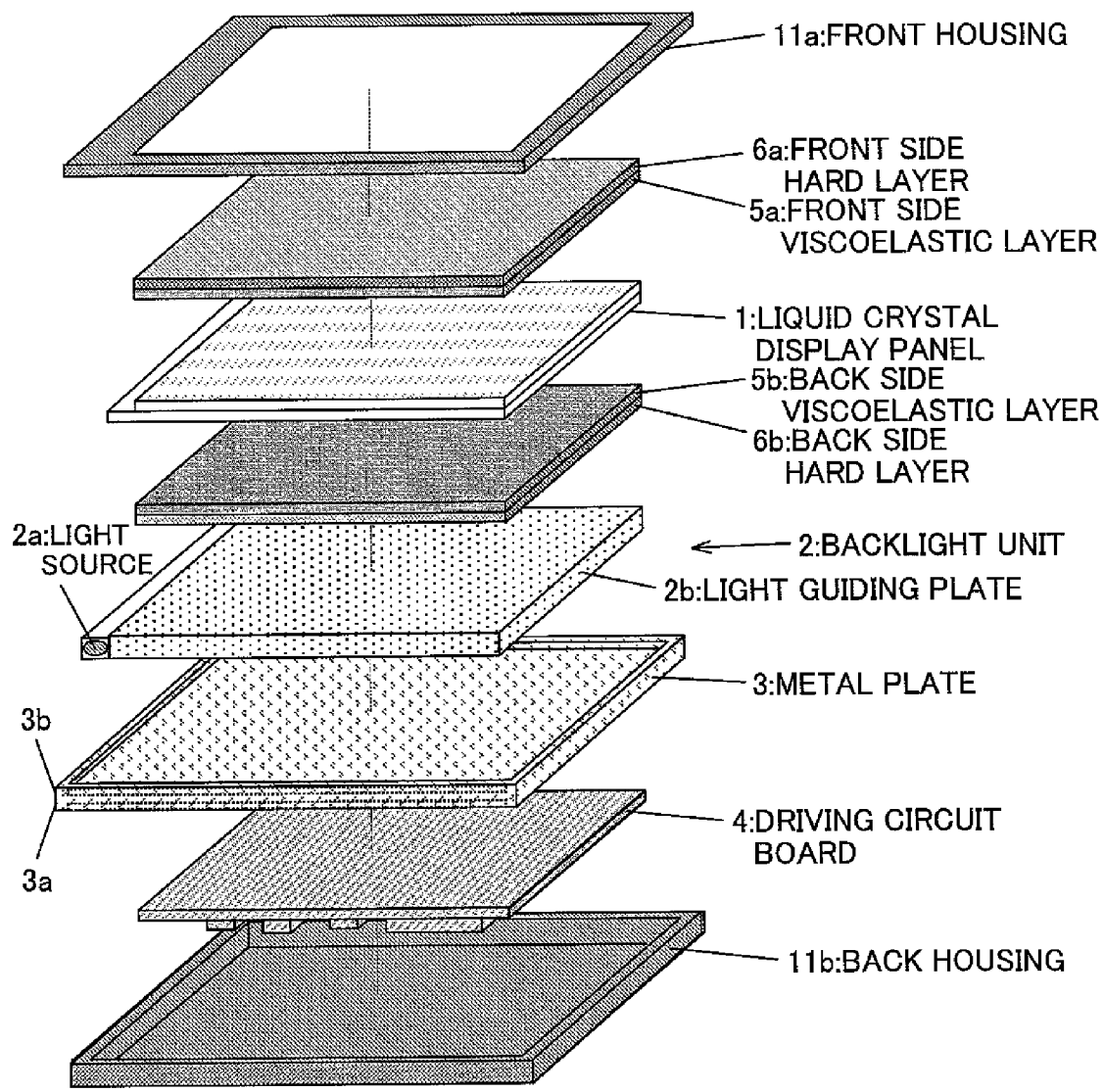
FIG. 10 is an exploded perspective view illustrating an arrangement of the liquid crystal display device.
Figure 12:
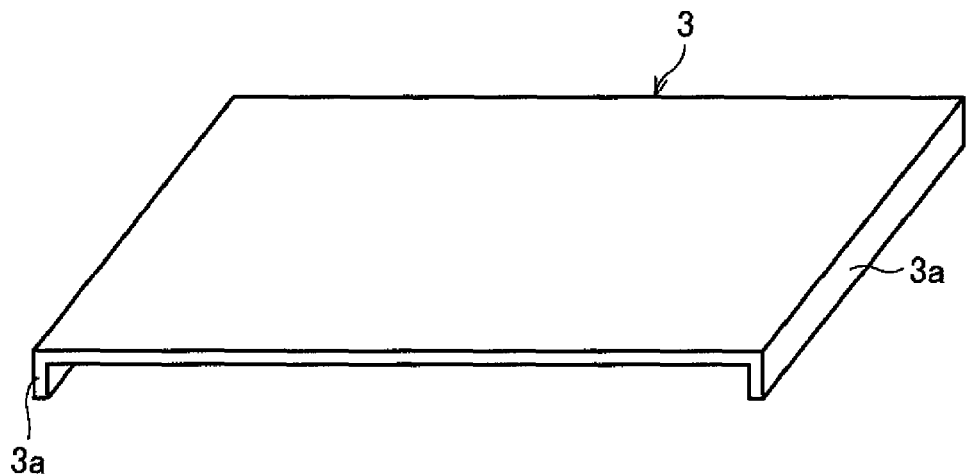
FIG. 12 is a perspective view illustrating a modification of a metal plate of the liquid crystal display device.

The falling portion 3a and the rising portion 3b are provided along opposed edges of a rectangular metal plate 3 as illustrated in FIG. 10, in the present preferred embodiment. Note that there are two pairs of edges as the opposed edges. However, the present invention is not necessarily limited to this, and is sufficient as long as at least the falling portions 3a are provided along at least a pair of opposed edges of the metal plate 3, as illustrated in FIG. 12.

Figure 13:
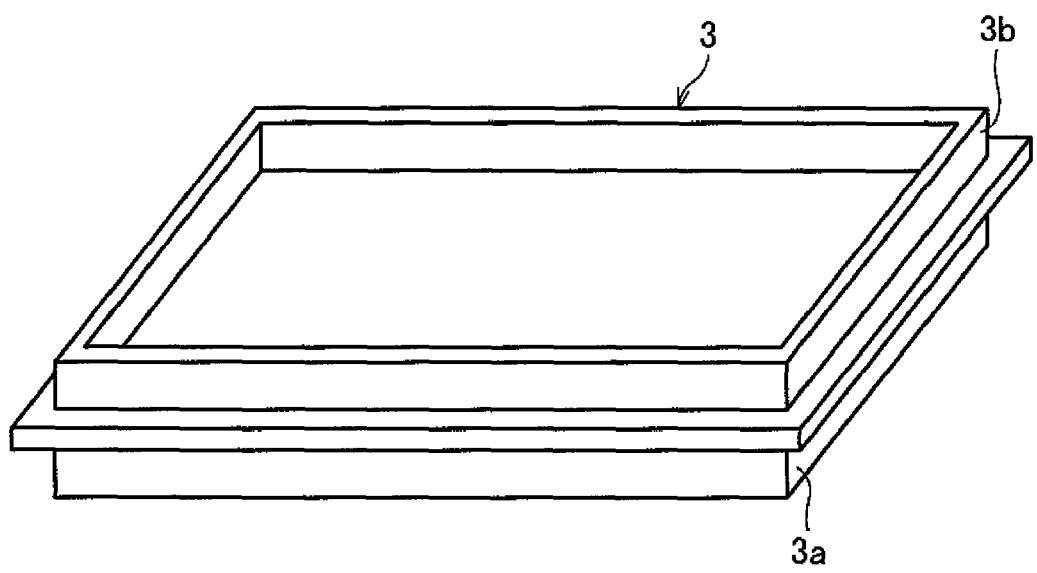
FIG. 13 is a perspective view illustrating another modification of a metal plate of the liquid crystal display device.

In the present preferred embodiment, the falling portion 3a and the rising portion 3b are preferably arranged along edges of the metal plate 3. However, the present invention is not necessarily limited to this, and may be provided on a position a little inside of the edges of the metal plate 3, as illustrated in FIG. 13.

Further, the falling portion 3a and the rising portion 3b are sufficient as long as the falling portion 3a and the rising portion 3b are arranged along the edges. That is to say, the falling portion 3a and the rising portion 3b are not necessarily completely continuous, respectively; the falling portion 3a and the rising portion 3b may have a portion which is unconnected, although most portions are continuous.

Figure 9:
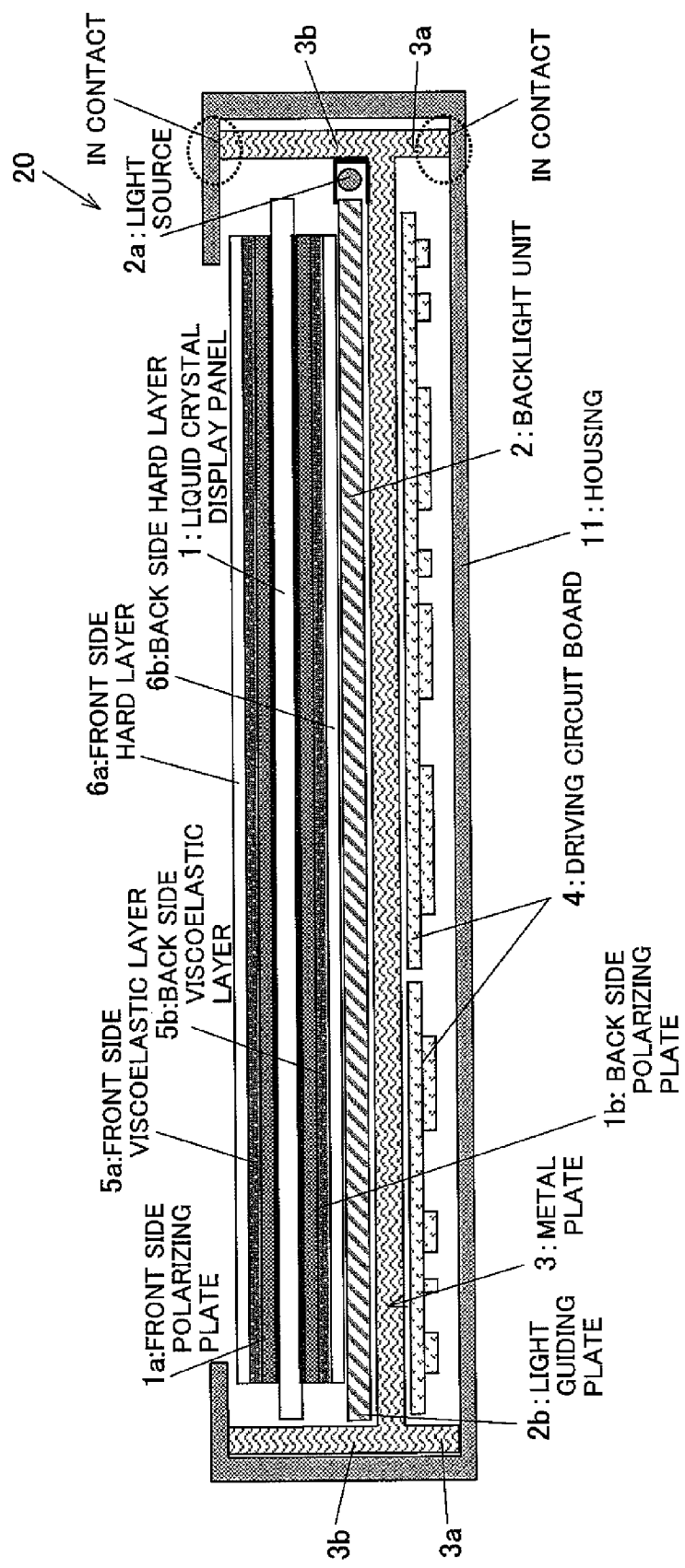
FIG. 9 is cross sectional view illustrating an arrangement of another preferred embodiment of a liquid crystal display device of the present invention.

Moreover, in the present preferred embodiment, when the falling portion 3a and the rising portion 3b are positioned on the edges of the metal plate 3, a lower end of the falling portion 3a and an upper end of the rising portion 3b are to be in contact with the housing 11 of the liquid crystal display device 20, as illustrated in FIG. 9. As such, since the metal plate 3 is supported in such a manner that the metal plate 3 is fixed to the housing 11, the liquid crystal display device 20 can be arranged such that the liquid crystal display device 20 is strong against pressure applied to the display surface and the back surface of the liquid crystal display panel 1 and pushup of the driving circuit board 4 or the like when dropped due to gravity; that is, the liquid crystal display panel 1 is arranged to have a low possibility of the liquid crystal display panel 1 to warp.

A step is generated under the light guiding plate 2b in a case where the light guiding plate 2b is broader than a flat portion on a surface of the metal plate 3, and also in a case where the metal plate 3 has a depression. This indicates that, as similar to the conventional product, the arrangement is one which the liquid crystal display panel 1 is easily breakable due to a stress concentration on the step. Therefore, a flat plane of the metal plate 3 positioned under the light guiding plate 2b necessarily reaches an area outside of the light guiding plate 2b.

The rigidity of the whole of the liquid crystal display device 20 against bending and twisting of the liquid crystal display device 20 can be improved by providing the falling portion 3a and rising portion 3b. As a result, it is possible to suppress generation of a warp on the liquid crystal display device 20 caused by an impact when dropped. This indicates that it is difficult for the liquid crystal display panel 1 to warp and break at a time when the liquid crystal display device 20 is dropped due to gravity.

Further, the falling portion 3a and the rising portion 3b each is in contact with an inside of the housing 11. This allows dispersion and transfer of the impact force from the housing 11 to the metal plate 3 when dropped in a state in which the display surface or the back surface is facing downwards. Hence, the impact against the liquid crystal display panel 1 is suppressed, which thus allows further reinforcement in strength.

The present preferred embodiment has an arrangement in which the lower end of the falling portion 3a is in contact with an inside of the back housing 11b, and the upper end of the rising portion 3b is in contact with an inside of the front housing 11a. This allows dispersion and transfer of the impact force when dropped in a state in which the display surface is facing downwards, in the following order: front housing 11a→metal plate 3→back housing 11b; and back housing 11b→metal plate 3→front housing 11a. Thus, the impact against the liquid crystal panel 1 is suppressed, which further allows reinforcement of strength.

Figure 14B:
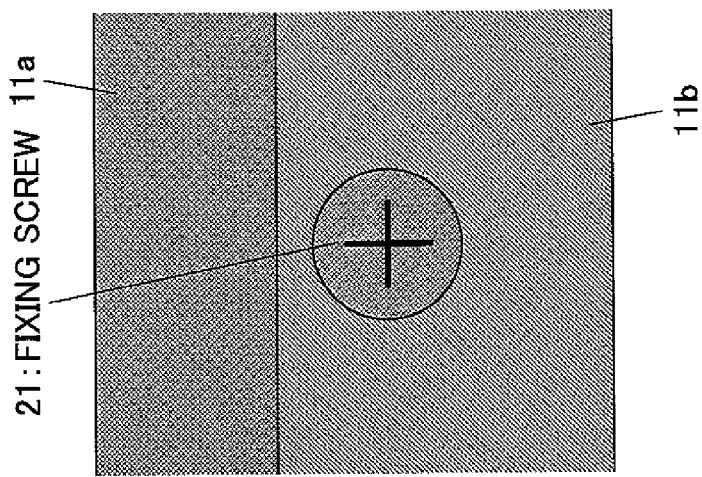
FIG. 14B is a side view illustrating the arrangement in the case where the metal plate, the bezel, and the housing of the liquid crystal display device are assembled together by use of the fixing screw.
Figure 14A:
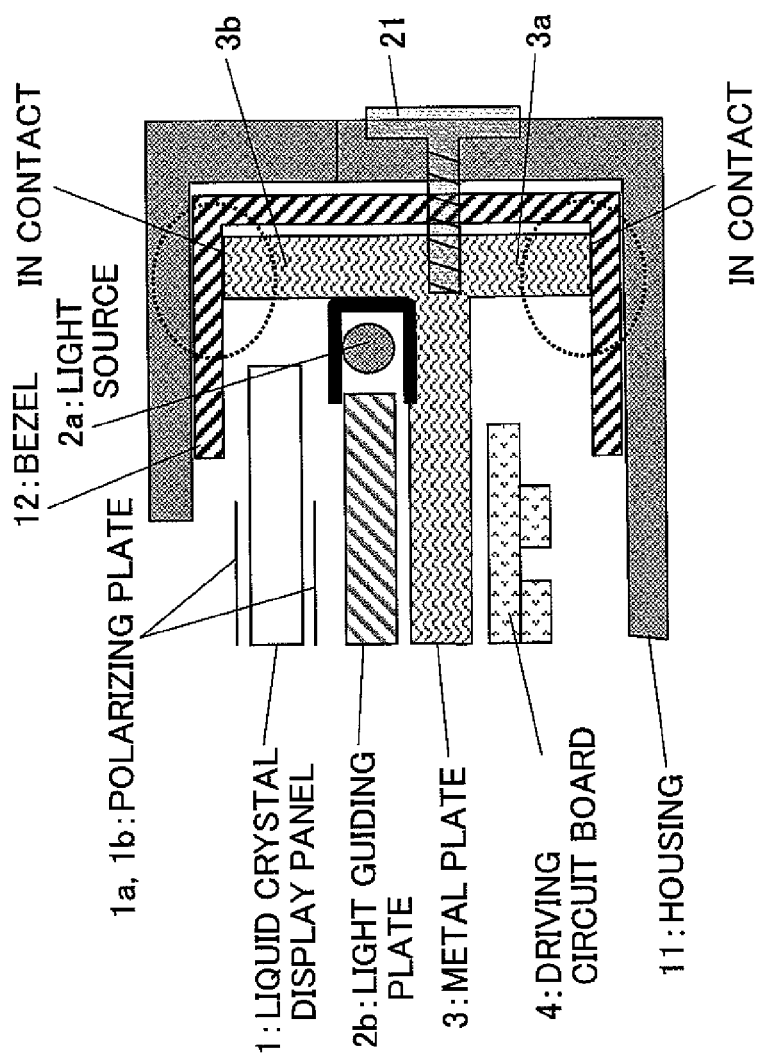
FIG. 14A is a cross sectional view illustrating an arrangement in a case where a metal plate, a bezel, and a housing of a liquid crystal display device in accordance with a preferred embodiment of the present invention are assembled together by use of a fixing screw.

Moreover, in the present preferred embodiment, as long as the housing 11 and the metal plate 3 are stacked, there is no problem even if a bezel (frame member) 12 is sandwiched between the housing 11 and the metal plate 3, as illustrated in FIGS. 14A and 14B. The bezel 12 integrally supports the liquid crystal display panel 1, the backlight unit 2, the metal plate 3 and the driving circuit board 4. In a preferred embodiment of the present invention, the bezel 12 is sufficient as long as the bezel 12 integrally supports at least the liquid crystal display panel 1, the backlight unit 2, and the metal plate 3. In this case, the upper end of the rising portion 3b and the lower end of the falling portion 3a is in contact with at least one of the bezel 12 and the housing 11.

The bezel 12 is shaped so as to surround outer wall surfaces of the falling portion 3a and the rising portion 3b, the lower end of the falling portion 3a, and the upper end of the rising portion 3b, and to circumscribe the falling portion 3a and the rising portion 3b, as illustrated in FIG. 14A, for example. A longitudinal section of the outer wall is parallel or substantially parallel to a direction with which the liquid crystal display panel 1, the backlight system 2, the metal plate 3 and the driving circuit board 4 are stacked.

Figure 15A:
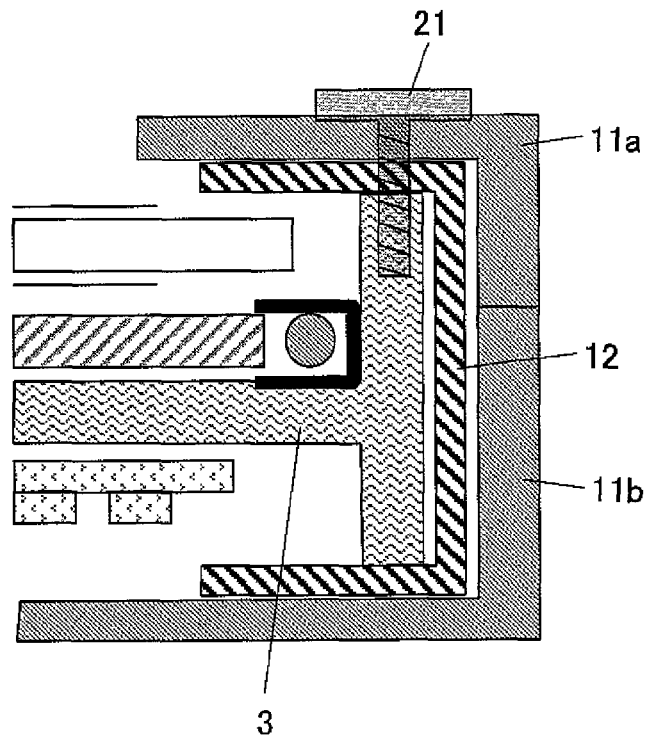
FIG. 15A is a cross sectional view illustrating another arrangement in the case where the metal plate, the bezel, and the housing of the liquid crystal display device are assembled together by use of the fixing screw.
Figure 15B:
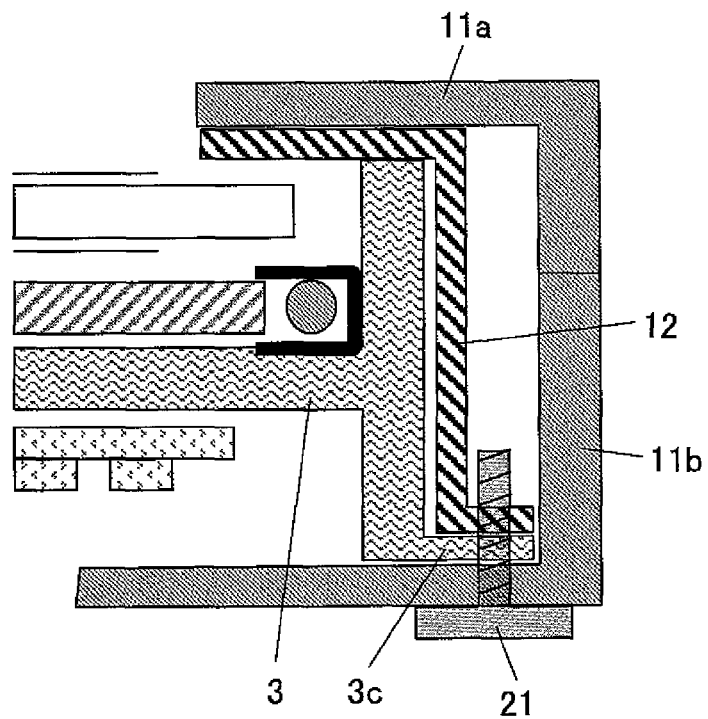
FIG. 15B is a cross sectional view illustrating still another arrangement in the case where the metal plate, the bezel, and the housing of the liquid crystal display device are assembled together by use of the fixing screw.

A shape of the bezel 12 may be modified so as to suit a shape of the metal plate 3 in a case where the strength of the metal plate 3 is further reinforced by providing a bent section 3c which is bent along an inside of a bottom section of the back housing 11b from the lower end of the falling portion 3a, as illustrated in FIG. 15B, for example. That is to say, in a case where the bent section 3c is arranged so as to extend toward the outer wall of the back housing 11b from the lower end of the falling portion 3a, the bezel 12 may have a bent section of a same shape as the bent section 3c, and may be shaped so as to circumscribe an outer wall surface of the falling portion 3a and rising portion 3b, an upper surface of the bent section 3c, and the upper end of the rising portion 3b.

As a modification of the bezel 12 and the metal plate 3 that are illustrated in FIG. 14A, the metal plate 3 may be modified so as to have just the falling portion 3a and not the rising portion 3b. This modification is possible by replacing the rising portion 3b with a portion of the bezel 12, and thickening a thickness of an upper portion of the bezel 12.

Similarly, the metal plate 3 can be modified so as to have just the rising portion 3b and not the falling portion 3a, by replacing the falling portion 3a with a portion of the bezel 12, and thickening a thickness of a lower portion of the bezel 12.

As such, the bezel 12 lies between the housing 11 and at least one of the falling portion 3a and the rising portion 3b, in other words, sandwiched between an inside surface of the housing 11 and at least one of the upper end of the falling portion 3a and the lower end of the rising portion 3b, so as to serve as a frame member which integrally supports the metal plate 3 and at least the liquid crystal display panel 1 and the backlight system 2.

Further, by fixing the metal plate 3 and the housing 11 and/or the bezel 12, rigidity of the liquid crystal display device 20 and resistance to pressure and drop due to gravity of the liquid crystal display device 20 are improved.

There are various methods to fix the metal plate 3 and the housing 11 and/or the bezel 12. For example, a first fixing method is to screw a fixing screw 21 perpendicularly to an outer side surface of the housing 11, as illustrated in FIGS. 14A and 14B. This screw integrally fixes the housing 11, the bezel 12 and the metal plate 3. The method is not necessarily limited to the outer side surface of the housing 11. For example, the fixing screw 21 may be screwed to an upper surface of the front housing 11a perpendicularly so as to integrally fix the housing 11, the bezel 12 and the metal plate 3, as illustrated in FIG. 15A. Alternatively, the fixing screw 21 may be screwed to a lower surface of the back housing 11b perpendicularly so as to integrally fix the housing 11, the bezel 12 and the metal plate 3 via the bent section 3c and the bent section of the bezel 12, as illustrated in FIG. 15B.

Figure 16A:
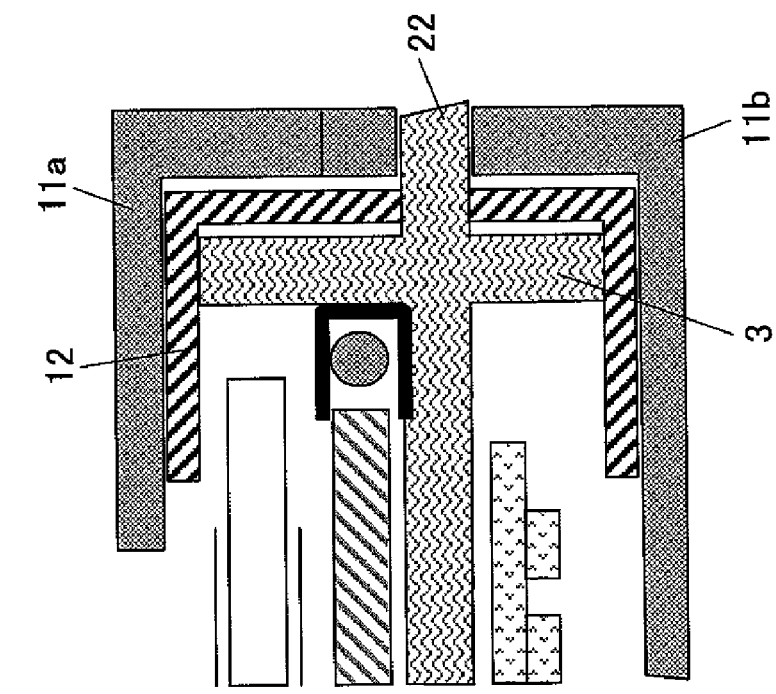
FIG. 16A is a cross sectional view illustrating an arrangement in a case where the metal plate, the bezel, and the housing of the liquid crystal display device are assembled together by use of a claw.
Figure 16B:
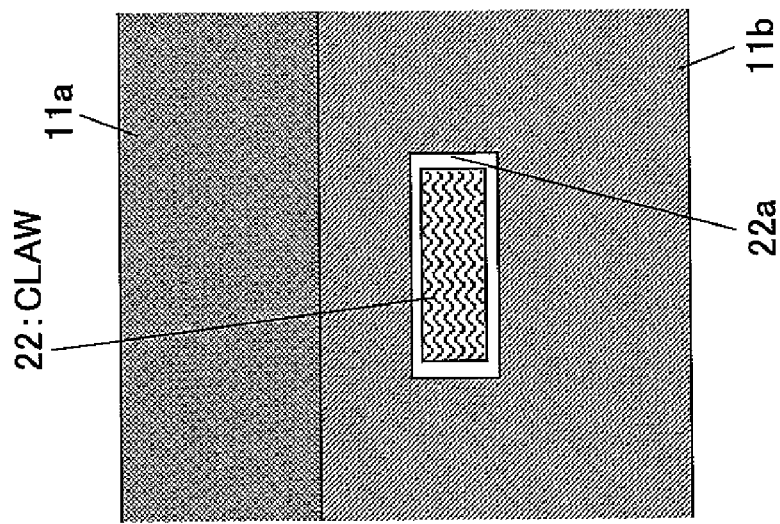
FIG. 16B is a side view illustrating the arrangement in the case where the metal plate, the bezel, and the housing of the liquid crystal display device are assembled together by use of the claw.
Figure 17:
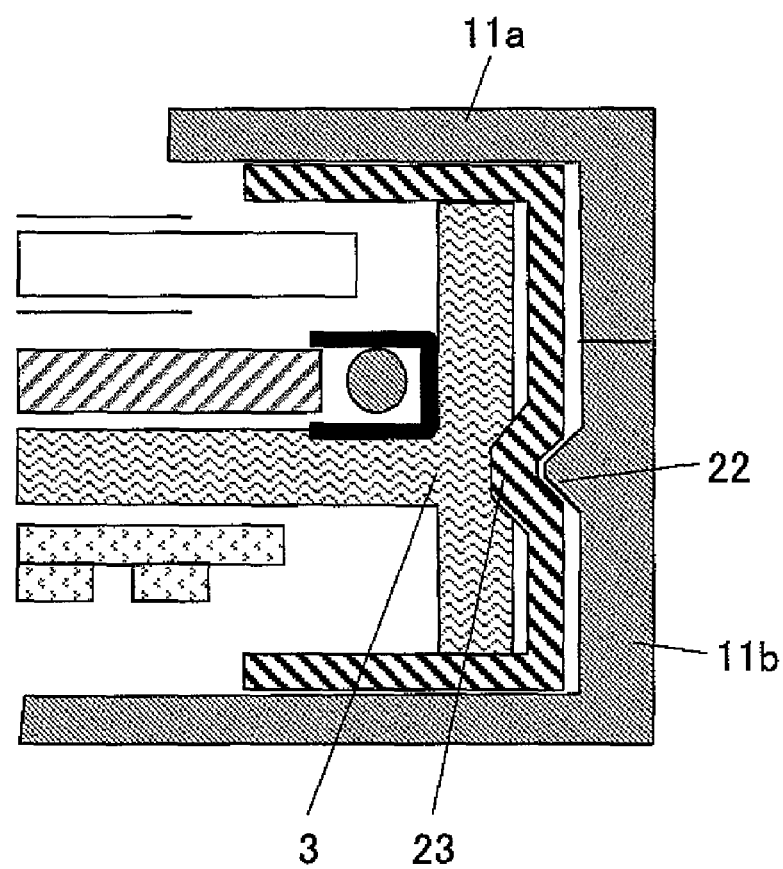
FIG. 17 is a cross sectional view illustrating another arrangement in the case where the metal plate, the bezel, and the housing of the liquid crystal display device are assembled together by use of the claw.

A claw 22 (projection) may be used as a second fixing method, as illustrated in FIGS. 16A and 16B. An arrangement as follows may be adopted as the claw 22, for example: a claw 22 of a projection form is provided on a side of a horizontal section of the metal plate 3; the claw 22 is inserted through the bezel 12, and is fixed (joined) into a hole 22a of the housing 11. Moreover, the fixing method is not necessarily limited to this, and, for example, the claw 22 may be provided on one of the front housing 11a and back housing 11b, which claw 22 projects toward inside of the front housing 11a or the back housing 11b, and is to be inserted into a depression of the bezel 12, as illustrated in FIG. 17. Further, the bezel 12 may have a claw 23 formed thereon, which claw 23 is to be inserted into a depression of the metal plate 3. Note that the claw 22, the depression of the bezel 12, the claw 23, and the depression of the metal plate 3 are concentrically provided.

Figure 18B:
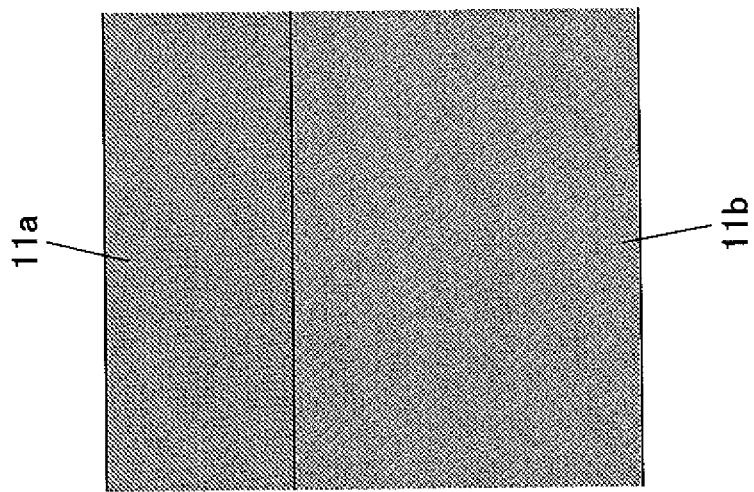
FIG. 18B is a side view illustrating the arrangement in the case where the metal plate, the bezel, and the housing of the liquid crystal display device are assembled together by use of the adhesive.
Figure 18A:
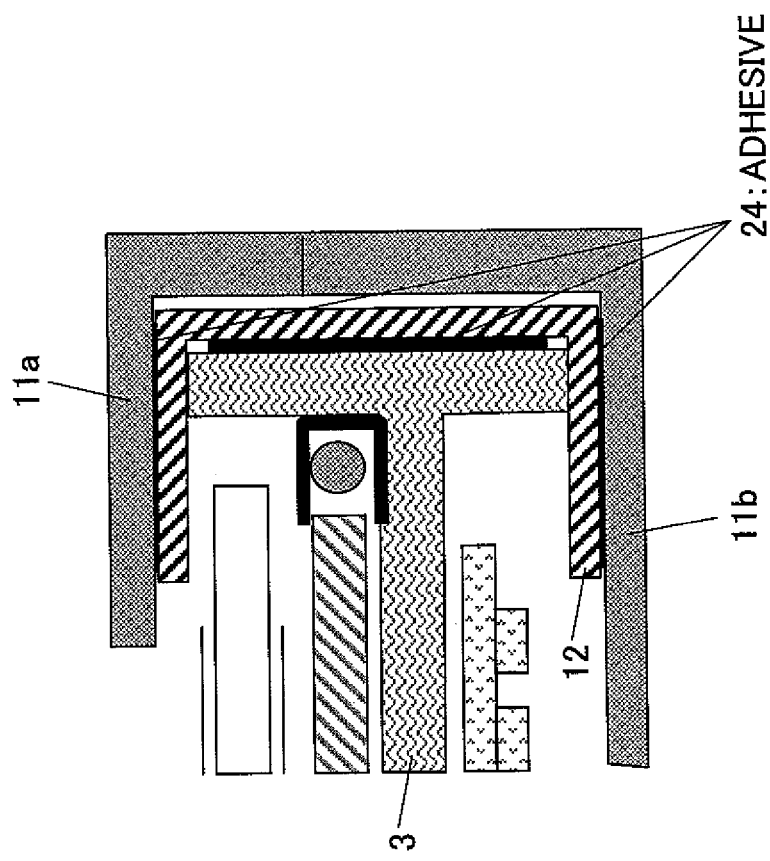
FIG. 18A is cross sectional view illustrating an arrangement in a case where the metal plate, the bezel, and the housing of the liquid crystal display device are assembled together by use of an adhesive.

As a third fixing method, an adhesive 24 may be used, as illustrated in FIGS. 18A and 18B. In FIGS. 18A and 18B, for example, the adhesive 24 is applied between the metal plate 3 and the bezel 12, between the bezel 12 and the front housing 11a, and between the bezel 12 and the back housing 11b, such that the metal plate 3, the bezel 12, and the front housing 11a are adhered to and fixed by use of the adhesive 24.

Figure 19A:
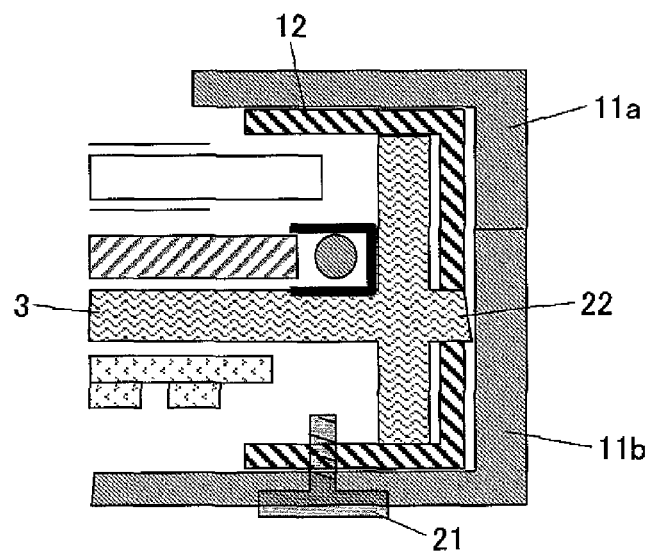
FIG. 19A is a cross sectional view illustrating an arrangement in a case where the metal plate, the bezel, and the housing of the liquid crystal display device are assembled together by use of a claw and an adhesive in combination.
Figure 19B:
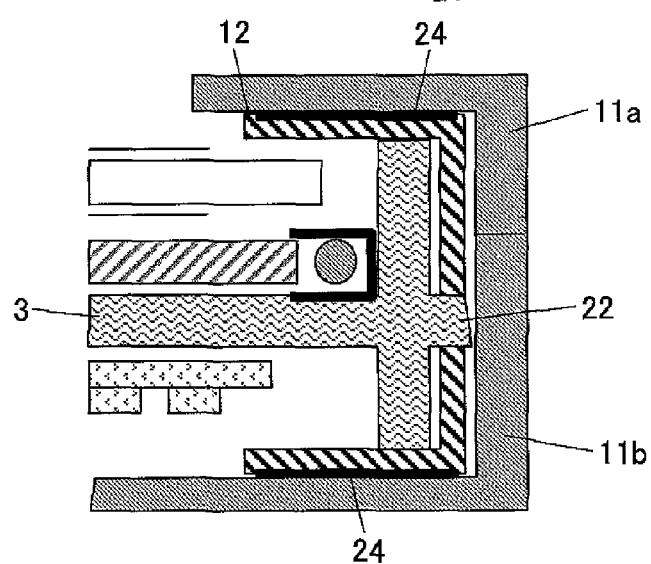
FIG. 19B is a cross sectional view illustrating another arrangement in the case where the metal plate, the bezel, and the housing of the liquid crystal display device are assembled together by use of the claw and the adhesive in combination.
Figure 19C:
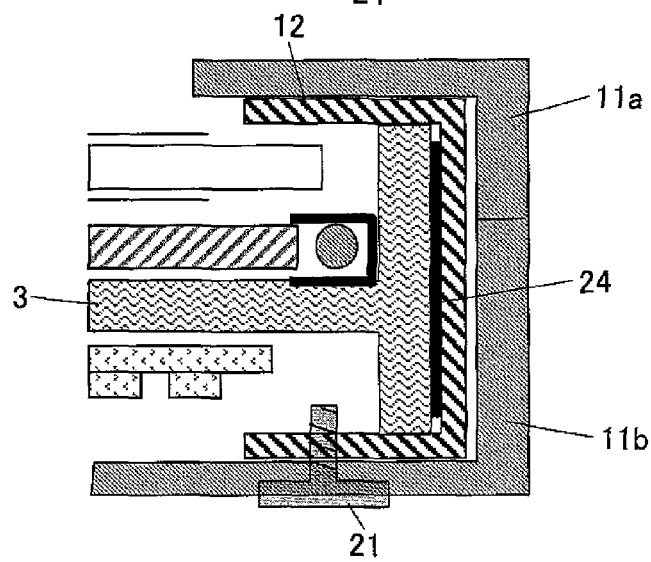
FIG. 19C is a cross sectional view of still another arrangement in the case where the metal plate, the bezel, and the housing of the liquid crystal display device are assembled together by use of the claw and the adhesive in combination.
Figure 21:
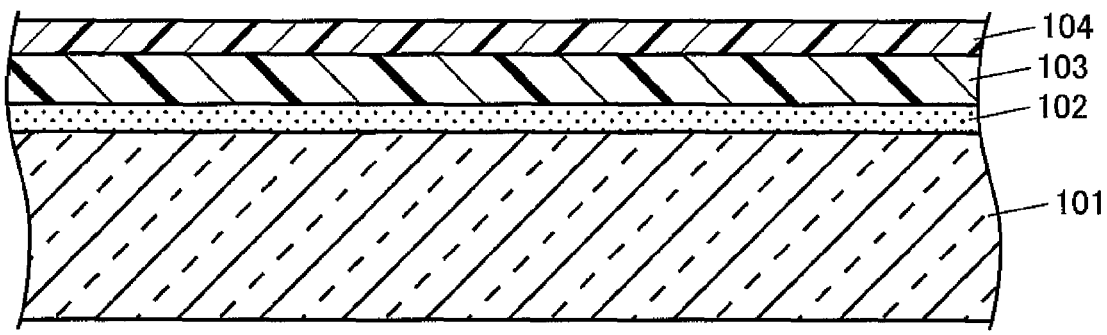
FIG. 21 is a cross sectional view illustrating an arrangement of a conventional liquid crystal display device.

Moreover, fixing may be carried out, for example, by use of the fixing screw 21, the claw 22, and the adhesive 24 in combination, as illustrated in FIGS. 19A, 19B, and 19C. This allows firm fixing of the metal plate 3, the bezel 12 and the housing 11.

Figure 23A:
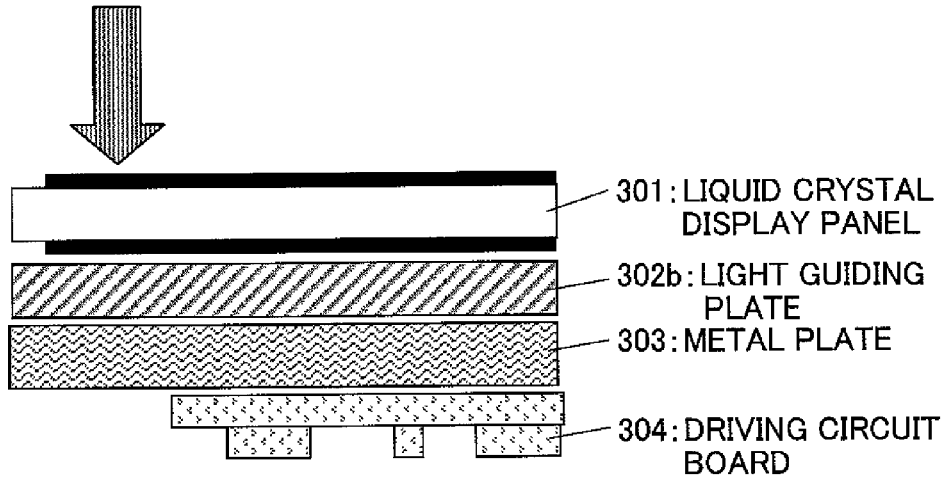
FIG. 23A is a cross sectional view illustrating still another arrangement of a liquid crystal display device when a load is placed on the liquid crystal display device from the upper side of the liquid crystal display panel.
Figure 23B:
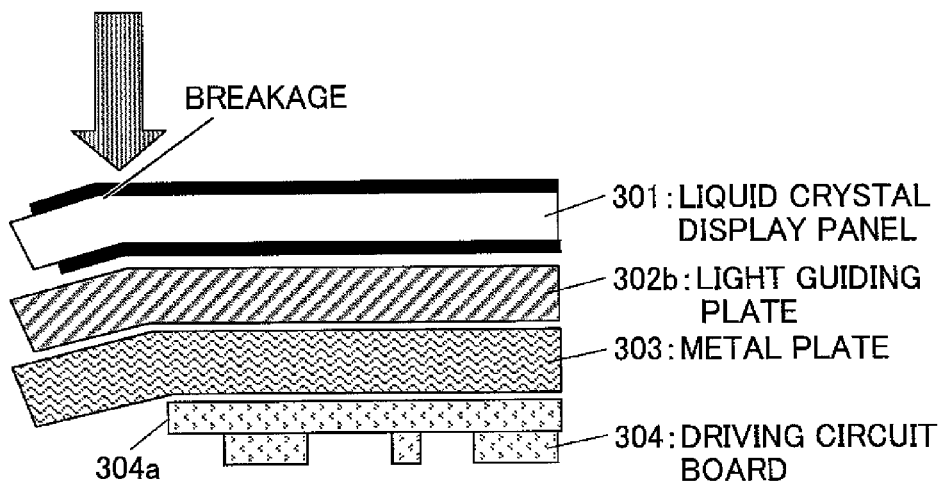
FIG. 23B is a cross sectional view illustrating the liquid crystal display device which has broken down due to the load.

Japanese Unexamined Patent Publication No. 142404/2001 (Tokukai 2001-142404) also suggests an arrangement which provides a metal plate 303 which has no rising portion on edges on its back side, as illustrated in FIG. 23A. However, as illustrated in FIG. 23B, the metal plate 303 warps at an edge of the metal plate 303, that is, a section on which the rising portion is not formed, due to a load applied from an upper side. Further, in response to the warp in the metal plate 303, a liquid crystal display panel 201 and a light guiding plate 302b also warps. As a result, the liquid crystal display panel 301 breaks. Japanese Unexamined Patent Publication No. 266759/2001 (Tokukai 2001-266759) also describes that rigidity is improved by having a depression not illustrated of the metal board 203. However, having the depression causes a back side of the light guiding plate 302b to be of a step form. This goes against an ideal arrangement of eliminating a step on the back side of the light guiding plate 302b. Further, in a case where a load is applied from a display surface side of the liquid crystal display panel 301, the liquid crystal display panel 301 warps. This causes the arrangement to be rather breakable.

The following description explains in detail of a difference in strength between a shape of the metal plate 303 described in Japanese Unexamined Patent Publication No. 142404/2001 (Tokukai 2001-142404) and a shape of the metal plate 3 of the present preferred embodiment.

First is a description of a difference in strength between the supporting form of the metal plate 303 and that of the metal plate 3. An amount of deflection (δ max) in a case where there is no supporting member on the edges of a plate is represented as:

Amount of deflection(δ max)=$PL^3/3EI$;

in a case where both edges of a plate are supported by free ends, the amount of deflection (δ max) is represented as:

Amount of deflection(δ max)=$PL^3/48EI$;

and further, in a case where both edges of a plate are supported by fixed ends, the amount of deflection (δ max) is represented as:

Amount of deflection(δ max)=$PL^3/192EI$, where L denotes a length of the plate, E denotes a modulus of elasticity, I denotes a second moment of area, and P denotes a concentrated load.

Namely, the amount of deflection significantly differs depending on whether the edges (i) are not supported, (ii) are supported by free ends, or (iii) are supported by fixed ends, even if the amount of deflection is of a same plate.

Hence, it is possible to reduce the amount of deflection to about 1/16 by providing a supporting member, and further reduce the amount of deflection to about 1/4 by changing how to support the edges, from free ends to fixed ends.

Here, the arrangement of the present preferred embodiment provides the falling portion 3a and the rising portion 3b around the metal plate 3. Conversely, the arrangement can be considered as a state in which the plate portion of the metal plate 3 is fixed to the falling portion 3a and the rising portion 3b, that is, a case where both the edges of the metal plate 3 are supported by fixed ends.

On the other hand, the arrangement of Japanese Unexamined Patent Publication No. 142404/2001 (Tokukai 2001-142404) is considered as a case where the metal plate 303 has no supporting members, or is supported by the free ends. As a result, the arrangement of the present preferred embodiment has a smaller amount of deflection (δ max) as compared to the arrangement of Japanese Unexamined Patent Publication No. 142404/2001 (Tokukai 2001-142404).

A deflection of the falling portion 3a and rising portion 3b may occur in the arrangement of the present preferred embodiment. Therefore, the effect is actually unattainable such that the amount of deflection is reduced to about 1/4. However, it is understandable that the arrangement is more difficult to warp as compared to the arrangement of Japanese Unexamined Patent Publication No. 142404/2001 (Tokukai 2001-142404) in which the metal plate 303 behaves as the free ends.

The above description explains an effect in a case where attention is given to a supporting form of the flat portion of the metal plate 3. The following description explains an effect in regards to a flexural rigidity of a whole of the metal plate 3 that has the falling portion 3a and the rising portion 3b.

A strong flexural rigidity suppresses an amount of warp generated by an impact when dropped, in a case of a drop due to gravity. Therefore, breakage of the liquid crystal display panel 1 does not easily or readily occur. The arrangement which has the falling portion 3a and rising portion 3b along the outer periphery of the present preferred embodiment is capable of accomplishing the improvement in rigidity while keeping the liquid crystal module thin and lightweight.

First, a second moment of area of (i) a plate-shaped metal plate and (ii) a metal plate on which the falling portion 3a and rising portion 3b are provided along the periphery of the metal plate are calculated as shown in FIG. 20.

In FIG. 20, in a case where, for example, a plate thickness t1 is about 1 mm, a plate length b1 is about 100 mm, a total height t2 of the falling portion 3a and rising portion 3b is about 5 mm, a plate thickness b2 of the falling portion 3a and rising portion 3b is about 1 mm, the second moment of area I of the conventional metal plate 203 is about 8.3 mm$^4$, and the second moment of area I of the metal plate 3 of the present preferred embodiment which provides the falling portion 3a and rising portion 3b is about 29.2 mm$^4$. Consequently, the second moment of area I of the present preferred embodiment is about 3.5 times more of the conventional metal plate 203. When considering this result as the amount of deflection (δ max), the amount of deflection may be made to approximately 2/7, since the amount of deflection is in inverse proportion to the second moment of area I, as acknowledgeable from the formula of the amount of deflection.

In the above description, a shape of the periphery of the metal plate 3 is set as, for example, the total height t2 of the falling portion 3a and rising portion 3b as about 5 mm, and the plate thickness b2 of the falling portion 3a and rising portion 3b as about 1 mm. However, a higher total height t2 of the falling portion 3a and rising portion 3b and a thicker plate thickness b2 of the falling portion 3a and rising portion 3b demonstrate more effect in suppression of the deflection. For example, in a case where the total height t2 of the falling portion 3a and rising portion 3b is about 10 mm, the amount of deflection may be reduced to about 1/20 of that of a metal plate 3 with only a flat plane. Therefore, it is possible to adopt an arrangement that is extremely strong against bending and twisting that occurs when dropped due to gravity.

That is to say, if the metal plate 303 or the metal plate 3 is provided on a back side of the backlight system, it is possible to reduce surface load and a warp (amount of deflection) generated caused by a drop due to gravity, according to the shape of the periphery of the metal plate 303 or 3. Therefore, according to the arrangement of the present preferred embodiment, an amount of warp generated is suppressed, and a strength of the liquid crystal display device 20 against external force such as a load, a drop due to gravity, and dropping of an object on the display surface, each of which may occur at a time of use, can be reinforced, while reducing thickness and weight of the liquid crystal display device 20.

As such, in the liquid crystal display device 20 of the present preferred embodiment, the metal plate 3 is arranged such that a shape of a back side and a periphery of the liquid crystal display panel 1 is improved, instead of taking measures such as providing a protection board on a display surface side of the liquid crystal display panel 1, which such measures drop a display performance. This thus allows reduction of breakage of the liquid crystal display panel 1 due to pressure applied from a display surface of the liquid crystal display panel 1, a pushup applied from the driving circuit board when dropped due to gravity, and further a warp of the liquid crystal module caused by a drop due to gravity. As a result, a bending stress which is applied on the liquid crystal display panel 1 is suppressed, and hence allows providing of the liquid crystal display panel 1 which is capable of attaining strength while reduced in thickness and weight.

As described above, the liquid crystal display device 20 of the present preferred embodiment includes a plate (hereinafter referred to as "rigid plate") made of rigid material, provided between the backlight unit 2 and the driving circuit board 4, which rigid plate has a plane surface of a broader area than that of the backlight unit 2. Therefore, the backlight unit 2 is supported by a whole of a surface of the rigid plate. Consequently, even if a load is applied from an upper side of the liquid crystal display panel 1, the backlight unit 2 does not bend at an edge of the rigid plate.

Moreover, the falling portion 3a is provided along at least a pair of opposed edges of the rigid plate, which falling portion projects toward a driving circuit board side of the rigid plate. Consequently, the falling portion 3a provided along the edges allows the rigid plate to serve as a fixed beam, and causes a second moment of area to increase; thus, the deflection is reduced. This effect is attained as long as the falling portion 3a is arranged along at least a pair of opposed edges of the rigid plate.

As a result, it is possible to provide a liquid crystal display device 20 which is capable of reducing breakage caused by a load placed on the display surface of the liquid crystal display panel 1 and an impact when dropped.

It is preferable for the liquid crystal display device 20 of the present preferred embodiment to have a rising portion 3b provided along at least a pair of opposed edges of the rigid plate, which rising portion 3b projects toward an opposite side of the driving circuit board 4. This allows a further increase in the second moment of area, by which deflection is reduced.

Moreover, in the liquid crystal display device 20 of the present preferred embodiment, the rigid plate preferably has a rectangular or substantially rectangular shape. Note that a rectangle conceptually includes a square.

This makes it possible to provide a liquid crystal display device 20 capable of reducing breakage caused by a load placed on the display surface of the liquid crystal display panel 1 and an impact when dropped, in a case where the shape of the liquid crystal display device 20 is of a common rectangle.

Moreover, in the liquid crystal display device 20 of the present preferred embodiment, the rigid plate preferably has a rectangular or substantially rectangular shape, and both the falling portion 3a and rising portion 3b are preferably provided along each of four edges of the rigid plate. Therefore, the rigid plate serves as a fixed beam in transverse and longitudinal directions, and further the second moment of area is increased. Therefore, the deflection is further reduced.

Moreover, the rigid plate is the metal plate 3 in the liquid crystal display device 20 of the present preferred embodiment. Hence, a common metal plate 3 may be readily used as the rigid plate. The metal plate 3 allows easy processing of the falling portion 3a. Therefore, such metal plate 3 requires low cost. Further, the metal plate 3 is usable for grounding the liquid crystal display device 20.

The metal plate 3 in the liquid crystal display device 20 is preferably made of aluminum alloy or magnesium alloy. This allows reduction in weight and improvement in rigidity of the metal plate 3, and further enables the liquid crystal display device 20 to have excellent heat releasing property due to its high heat conductivity.

In the liquid crystal display device 20 according to a preferred embodiment of the present embodiment, the rigid plate functions as a fixed beam by the rigid plate having at least one of an upper end of the rising portion 3b and a lower end of the falling portion 3a be in contact with the housing 11. Thus, it is possible to reduce the deflection. Moreover, such arrangement allows dispersion of impact on a front or back surface of the liquid crystal display device 20, from the housing 11 to the rigid plate having a high rigidity. Hence, breakage of the liquid crystal display device 10 is reduced.

Moreover, in the liquid crystal display device 20 of the present preferred embodiment, a bezel 12 which integrally supports at least the liquid crystal display panel 1, the backlight unit 2, and the rigid plate 3 may be used. This allows handling of the liquid crystal display panel 1, the backlight unit 2, and the rigid plate 3 as one integrated unit, which is a liquid crystal module. Moreover, the rigid plate functions as a fixed beam when at least one of the upper end of the rising portion 3b and the lower end of the falling portion 3a is in contact with at least one of the bezel 12 and the housing 11. This allows reduction of the deflection. This arrangement allows dispersion of an impact from the front or back surface of the liquid crystal display device 20, from the housing 11 to the rigid plate having high rigidity, via the bezel 12. Hence, it is possible to reduce a possibility of breakage of the liquid crystal display device 20.

In the liquid crystal display device 20 of the present preferred embodiment, the backlight unit 2 includes a light guiding plate 2b. This allows reduction of thickness of the backlight unit 2.

A tablet personal computer that serves as a portable electronic apparatus of the present preferred embodiment includes the foregoing liquid crystal display device 20.

Consequently, it is possible to provide a portable electronic apparatus including the liquid crystal display device 20, which liquid crystal display device 20 is capable of reducing breakage caused by a load placed on a display surface of the liquid crystal display panel 1, and an impact when the liquid crystal display device 20 is dropped.

The preferred embodiments and specific examples of implementation discussed in the foregoing detailed explanation serve solely to illustrate the technical details of the present invention, which should not be narrowly interpreted within the limits of such preferred embodiments and specific examples, but rather may be applied in many variations within the spirit of the present invention.

The present invention is applicable to a display device including a display panel, a backlight, and a driving circuit board for driving the display panel and the backlight, and is applicable to a portable electronic apparatus including the display device. As the display device, a liquid crystal display device of an active matrix type or the like may be used, and the display apparatus may be used in an electrophoresis display, a twist ball display, a reflective display which uses fine prism film, a display which uses light modulation elements, for example, a digital mirror device, and a display which uses elements such as a light emitting device for example organic EL light emitting device, inorganic EL light emitting device, and LED (Light Emitting Diode), which are changeable in emission luminance. The portable electronic apparatus in which the display device is applicable is, for example, a tablet personal computer, a display of a notebook computer, an information mobile terminal (PDA: Personal Digital Assistant), and a mobile phone.

The present invention is not limited to the portable electronic apparatus (tablet personal computer, display of a notebook computer, an information mobile terminal and a mobile phone). For example, an effect of strength reinforcement so that the liquid crystal display device is strong and resistant against external load which may occur at a time of carrying and handling the liquid crystal display device is attained also with a large-sized liquid crystal display apparatus such as a liquid crystal TV, information display or the like.

Hence, the arrangement of the present invention is applicable to all slim liquid crystal display devices including a large-sized TV.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display apparatus comprising:
a display panel;
a driving circuit board arranged to drive the display panel;
a front side viscoelastic layer that is viscoelastic and arranged to cover a display surface of the display panel;
a front side hard layer that has a higher modulus of elasticity than the front side viscoelastic layer, and is arranged to cover the front side viscoelastic layer;
a back side viscoelastic layer that is viscoelastic, and is arranged to cover a back surface of the display panel;
a back side hard layer that has a higher modulus of elasticity than the back side viscoelastic layer, and is arranged to cover the back side viscoelastic layer; and
a rigid plate made of rigid material having a plane surface, which is provided on a back side of the back side hard layer; wherein
the back side viscoelastic layer has a thickness Tb of not less than about 20 μm, and the front side viscoelastic layer has a thickness Ta and satisfying:

$Ta/Tb > 1 (Tb \neq 0)$.

2. The display apparatus as set forth in claim 1, further comprising:
a backlight, the rigid plate being sandwiched between the backlight and the driving circuit board;
the driving circuit board including a circuit arranged to drive the backlight; and
the plane surface of the rigid plate being broader than the backlight.

3. The display apparatus as set forth in claim 2, wherein the backlight includes a light guiding plate.

4. The display apparatus as set forth in claim 1, wherein the thickness Ta of the front side viscoelastic layer and the thickness Tb of the back side viscoelastic layer satisfy:

$Ta/Tb > 2 (Tb \neq 0)$.

5. The display apparatus as set forth in claim 1, wherein the thickness Ta of the front side viscoelastic layer satisfies:

$Ta \geq 50$ μm.

6. The display apparatus as set forth in claim 1, wherein the thickness Tb of the back side viscoelastic layer satisfies:

$20$ μm $\leq Tb \leq 50$ μm.

7. The display apparatus as set forth in claim 6, wherein the thickness Ta of the front side viscoelastic layer and the thickness Tb of the back side viscoelastic layer satisfy:

$Ta/Tb > 2 (Tb \neq 0)$.

8. The display apparatus as set forth in claim 1, wherein the front side hard layer and the back side hard layer are made of inviscid material.

9. The display apparatus as set forth in claim 1, wherein at least one of the front side hard layer and the back side hard layer is a polarizing plate.

10. The display apparatus as set forth in claim 1, wherein at least one of the front side hard layer and the back side hard layer is a phase plate.

11. The display apparatus as set forth in claim 1, wherein
the front side viscoelastic layer and the back side viscoelastic layer have nonlinear elasticity; and
the front side hard layer and the back side hard layer have linear elasticity.

12. The display apparatus as set forth in claim 1, wherein a falling portion is provided along at least a pair of opposed edges of the rigid plate, the falling portion projecting toward a driving circuit board side of the rigid plate.

13. The display apparatus as set forth in claim 12, further comprising:
a housing arranged to house the display panel, the driving circuit board, and the rigid plate; and
the falling portion being arranged so as to be in contact with an inside surface of the housing, and so as to integrally support the rigid plate and at least the display panel.

14. The display apparatus as set forth in claim 1, wherein a rising portion is provided along at least a pair of opposed edges of the rigid plate, the rising portion projecting toward an opposite side of the driving circuit board side of the rigid plate.

15. The display apparatus as set forth in claim 14, further comprising:
a housing arranged to house the display panel, the driving circuit board, and the rigid plate; and
the rising portion being arranged so as to be in contact with an inside surface of the housing, and so as to integrally support the rigid plate and at least the display panel.

16. The display apparatus as set forth in claim 1, wherein the rigid plate has a rectangular or substantially rectangular shape.

17. The display apparatus as set forth in claim 1, wherein both of a falling portion and a rising portion are provided along at least a pair of opposed edges of the rigid plate, the rising portion projecting toward an opposite side of the falling portion.

18. The display apparatus as set forth in claim 17, further comprising a backlight supported by an upper surface of the rigid plate.

19. The display apparatus as set forth in claim 17, further comprising:
a housing arranged to house the display panel, the rigid plate, and the driving circuit board; and
at least one of an upper end of the rising portion and a lower end of the falling portion of the rigid plate is arranged so as to be in contact with the housing.

20. The display apparatus as set forth in claim 19, further comprising a backlight supported by an upper surface of the rigid plate.

21. The display apparatus as set forth in claim 17, further comprising:
   a frame member arranged to integrally support at least the rigid plate and the display panel;
   a housing arranged to house the display panel, the rigid plate, the driving circuit board, and the frame member; and
   at least one of an upper end of the rising portion and a lower end of the falling portion of the rigid plate arranged to be in contact with at least one of the frame member and the housing.

22. The display apparatus as set forth in claim 21, further comprising a backlight supported by an upper surface of the rigid plate.

23. The display apparatus as set forth in claim 17, wherein the rigid plate has a rectangular or substantially rectangular shape.

24. The display apparatus as set forth in claim 1, wherein the rigid plate is a metal plate.

25. The display apparatus as set forth in claim 24, wherein the metal plate is made of aluminum alloy or magnesium alloy.

26. The display apparatus as set forth in claim 1, wherein the front side viscoelastic layer and the front side hard layer are repetitively stacked on the display surface of the display panel.

27. The display apparatus as set forth in claim 1, wherein the back side viscoelastic layer and the back side hard layer are repetitively stacked on the back surface of the display panel.

28. A portable electronic apparatus comprising the display apparatus recited in claim 1.

29. A stationary electronic apparatus comprising the display apparatus recited in claim 1.

30. A display apparatus comprising:
   a display panel;
   a driving circuit board arranged to drive the display panel;
   a front side viscoelastic layer that is viscoelastic, and is arranged to cover a display surface of the display panel;
   a front side hard layer that has a higher modulus of elasticity than the front side viscoelastic layer, and is arranged to cover the front side viscoelastic layer;
   a back side viscoelastic layer that is viscoelastic, and is arranged to cover a back surface of the display panel; and
   a back side hard layer that has a higher modulus of elasticity than the back side viscoelastic layer, and is arranged to cover the back side viscoelastic layer; wherein
   the back side viscoelastic layer has a thickness Tb of not less than about 20 µm, and the front side viscoelastic layer has a thickness Ta and satisfying:
   $Ta/Tb > 1 (Tb \neq 0)$.

31. A portable electronic apparatus comprising the display apparatus recited in claim 30.

32. A stationary electronic apparatus comprising the display apparatus recited in claim 30.

* * * * *